(12) United States Patent
Motzer et al.

(10) Patent No.: US 11,639,914 B2
(45) Date of Patent: May 2, 2023

(54) NON-DESTRUCTIVE TEST SYSTEMS WITH INFRARED THERMOGRAPHY ASSEMBLIES AND ULTRASONIC TEST ASSEMBLIES, AND ASSOCIATED METHODS

(71) Applicant: The Boeing Company, Chicago, IL (US)

(72) Inventors: William Paul Motzer, Mount Pleasant, SC (US); Eddie Thelonious Boyd, Charleston, SC (US); Sadie Lee Fieni, Glen Mills, PA (US); David A. Lilienthal, Summerville, SC (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/538,008

(22) Filed: Nov. 30, 2021

(65) Prior Publication Data

US 2022/0187249 A1 Jun. 16, 2022

Related U.S. Application Data

(60) Provisional application No. 63/126,305, filed on Dec. 16, 2020.

(51) Int. Cl.
*G01N 29/44* (2006.01)
*G01N 29/04* (2006.01)
*G01N 21/3563* (2014.01)

(52) U.S. Cl.
CPC ....... *G01N 29/041* (2013.01); *G01N 21/3563* (2013.01); *G01N 29/4445* (2013.01)

(58) Field of Classification Search
CPC ............. G01N 29/041; G01N 29/4445; G01N 29/043; G01N 29/2418; G01N 21/3563;
(Continued)

(56) References Cited

U.S. PATENT DOCUMENTS

| 4,670,653 A | 6/1987 | McConkle et al. |
| 4,883,971 A | 11/1989 | Jensen |

(Continued)

FOREIGN PATENT DOCUMENTS

| EP | 2973074 B1 | 4/2019 |
| WO | WO 2018002871 | 1/2018 |

OTHER PUBLICATIONS

U.S. Appl. No. 16/874,489, filed May 14, 2020, Fetzer et al.
(Continued)

*Primary Examiner* — Suman K Nath
(74) *Attorney, Agent, or Firm* — Kolitch Romano Descenzo Gates LLC

(57) ABSTRACT

Non-destructive test systems and associated methods. A non-destructive test system includes an infrared thermography assembly and an ultrasonic test assembly for testing a test piece. The infrared thermography assembly may include one or more thermography sensor modules and a thermography test controller. The ultrasonic test assembly may include one or more ultrasonic sensor subassemblies with respective excitation modules and respective detector modules and an ultrasonic test controller. Each excitation module may be configured to produce a respective ultrasonic beam within the test piece, and each detector module may be configured to detect a respective reflected vibration of the test piece. In some examples, a method of performing a non-destructive test on a test piece includes testing an infrared test region of the test piece with an infrared thermography assembly and testing an ultrasonic test region of the test piece with an ultrasonic test assembly.

20 Claims, 5 Drawing Sheets

(58) Field of Classification Search
CPC .......... G01N 25/72; G01N 2291/0231; G01N 2291/2694; G01N 2291/044; G01N 2291/105
See application file for complete search history.

(56) References Cited

U.S. PATENT DOCUMENTS

| | | |
|---|---|---|
| 6,593,156 B2 | 7/2003 | Nikawa |
| 7,287,902 B2 | 10/2007 | Safai et al. |
| 7,312,454 B2 | 12/2007 | Safai et al. |
| 7,513,964 B2 | 4/2009 | Ritter et al. |
| 7,520,666 B2 * | 4/2009 | Pevzner ................. G01N 25/72 374/45 |
| 7,553,070 B2 | 6/2009 | Kollgaard et al. |
| 7,966,883 B2 | 6/2011 | Lorraine et al. |
| 8,332,165 B1 | 12/2012 | Tat et al. |
| 8,539,818 B2 | 9/2013 | van Staden |
| 8,965,100 B2 | 2/2015 | Lin et al. |
| 9,164,066 B1 | 10/2015 | Bossi et al. |
| 9,221,506 B1 | 12/2015 | Georgeson et al. |
| 9,334,066 B2 | 5/2016 | Tapia et al. |
| 9,358,331 B2 | 6/2016 | Fulkerson et al. |
| 9,383,342 B1 | 7/2016 | Bossi et al. |
| 9,404,898 B1 | 8/2016 | Georgeson et al. |
| 9,414,026 B2 | 8/2016 | Blanchard et al. |
| 9,433,720 B2 | 9/2016 | Updyke et al. |
| 9,575,033 B1 | 2/2017 | Georgeson et al. |
| 9,625,423 B2 | 4/2017 | Bossi et al. |
| 9,645,012 B2 * | 5/2017 | Marsh ..................... G01S 17/06 |
| 9,709,443 B2 | 7/2017 | Holmes et al. |
| 9,746,445 B2 | 8/2017 | Hafenrichter et al. |
| 9,796,089 B2 | 10/2017 | Lawrence, III et al. |
| 9,861,733 B2 | 1/2018 | Burbank et al. |
| 9,907,897 B2 | 3/2018 | Burbank et al. |
| 10,035,103 B2 | 7/2018 | Fulkerson et al. |
| 10,094,794 B2 | 10/2018 | Thompson et al. |
| 10,126,273 B2 | 11/2018 | Pelivanov et al. |
| 10,260,953 B2 | 4/2019 | Engelbart et al. |
| 10,309,893 B2 | 6/2019 | Georgeson et al. |
| 10,345,267 B2 | 7/2019 | O'Donnell et al. |
| 10,514,363 B2 | 12/2019 | Ihn et al. |
| 10,571,390 B2 | 2/2020 | Motzer et al. |
| 10,677,715 B2 * | 6/2020 | Tat ..................... G01N 21/1702 |
| 10,690,581 B2 | 6/2020 | Thompson et al. |
| 11,044,011 B2 | 6/2021 | Georgeson et al. |
| 11,073,500 B2 | 7/2021 | Bingham et al. |
| 11,131,650 B2 | 9/2021 | Abolmaesumi et al. |
| 2004/0076216 A1 | 4/2004 | Chamberlain et al. |
| 2008/0137105 A1 * | 6/2008 | Howard ............... G01N 29/228 356/630 |
| 2012/0048021 A1 | 3/2012 | Ochiai et al. |
| 2013/0061677 A1 * | 3/2013 | Wang ................. G01N 29/2418 73/584 |
| 2016/0018324 A1 * | 1/2016 | Georgeson ............. G01N 29/04 250/341.6 |
| 2016/0123933 A1 | 5/2016 | Fetzer et al. |
| 2017/0297198 A1 | 10/2017 | Lawrence, III et al. |
| 2018/0361571 A1 | 12/2018 | Georgeson et al. |
| 2019/0300205 A1 | 10/2019 | Georgeson et al. |
| 2020/0011840 A1 | 1/2020 | Hafenrichter et al. |
| 2020/0015903 A1 | 1/2020 | Scheib et al. |
| 2021/0090269 A1 | 3/2021 | Troy et al. |
| 2021/0196385 A1 | 7/2021 | Shelton, IV et al. |
| 2021/0237867 A1 | 8/2021 | Georgeson et al. |

OTHER PUBLICATIONS

U.S. Appl. No. 17/526,831, filed Nov. 15, 2021, Fetzer et al.
Liu et al., *Survey: State of the Art in NDE Data Fusion Techniques*, IEEE Transactions on Instrumentation And Measurement, vol. 56, No. 6, Dec. 2007.
Park et al., *Visualization of hidden delamination and debonding in composites through noncontact laser ultrasonic scanning*, Composites Science and Technology 100, pp. 10-18, 2014.
Gao et al., The Method of Aiming towards the Normal Direction for Robotic Drilling, International Journal of Precision Engineering And Manufacturing, vol. 18, No. 6, pp. 787-794, Jun. 2017.

* cited by examiner

NON-DESTRUCTIVE TEST SYSTEMS WITH INFRARED THERMOGRAPHY ASSEMBLIES AND ULTRASONIC TEST ASSEMBLIES, AND ASSOCIATED METHODS

RELATED APPLICATION

The present application is a non-provisional of and claims priority to U.S. Provisional Patent Application No. 63/126,305, filed on Dec. 16, 2020, entitled "NON-DESTRUCTIVE TEST SYSTEMS WITH INFRARED THERMOGRAPHY ASSEMBLIES AND ULTRASONIC TEST ASSEMBLIES, AND ASSOCIATED METHODS," the complete disclosure of which is incorporated by reference.

FIELD

The present disclosure relates to non-destructive test systems with infrared thermography assemblies and ultrasonic test assemblies, and associated methods.

BACKGROUND

When manufacturing aircraft, vehicles, and other structures that are formed of composite materials, inspection of parts used to form these structures often is performed to determine whether the parts will have the desired material characteristics and/or to confirm that the parts are free of inconsistencies. To this end, many testing methodologies employ non-destructive testing to inspect the parts in a non-invasive manner. Several methods of non-destructive testing exist, including ultrasonic testing methods and infrared thermography testing methods. However, many such methods present trade-offs between efficiency and thoroughness. Thus, there exists a need for non-destructive test systems and associated methods that enable efficient and thorough testing.

SUMMARY

Non-destructive test systems with infrared thermography assemblies and ultrasonic test assemblies, and associated methods, are disclosed herein. A non-destructive test system for performing a non-destructive test on a test piece to detect a presence of inconsistencies within the test piece includes an infrared thermography assembly and an ultrasonic test assembly. The infrared thermography assembly is configured to test an infrared test region of the test piece to detect inconsistencies within the infrared test region, and the ultrasonic test assembly is configured to test an ultrasonic test region of the test piece to detect inconsistencies within the ultrasonic test region. In some examples, the infrared thermography assembly includes one or more thermography sensor modules and a thermography test controller. Each thermography sensor module is configured to receive infrared imaging data from the test piece, and the thermography test controller is configured to at least partially control operation of the infrared thermography assembly and to generate a thermography test signal based, at least in part, on the infrared imaging data. In some examples, the ultrasonic test assembly includes one or more ultrasonic sensor subassemblies and an ultrasonic test controller configured to at least partially control operation of the ultrasonic test assembly. In some examples, each ultrasonic sensor subassembly includes a respective excitation module and a respective detector module, with the respective excitation module being configured to produce a respective ultrasonic beam that propagates within the test piece. In some examples, the respective detector module of each ultrasonic sensor subassembly is configured to detect a respective reflected vibration at a respective ultrasonic detect location on the external surface of the test piece, which is generated within the test piece responsive to the respective ultrasonic beam. The ultrasonic test controller is configured to generate an ultrasonic test signal based, at least in part, on each respective reflected vibration.

In some examples, a method of performing a non-destructive test on a test piece includes testing an infrared test region of the test piece with an infrared thermography assembly to detect inconsistencies within the infrared test region and testing an ultrasonic test region of the test piece with an ultrasonic test assembly to detect inconsistencies within the ultrasonic test region.

DESCRIPTION

Figure 1:
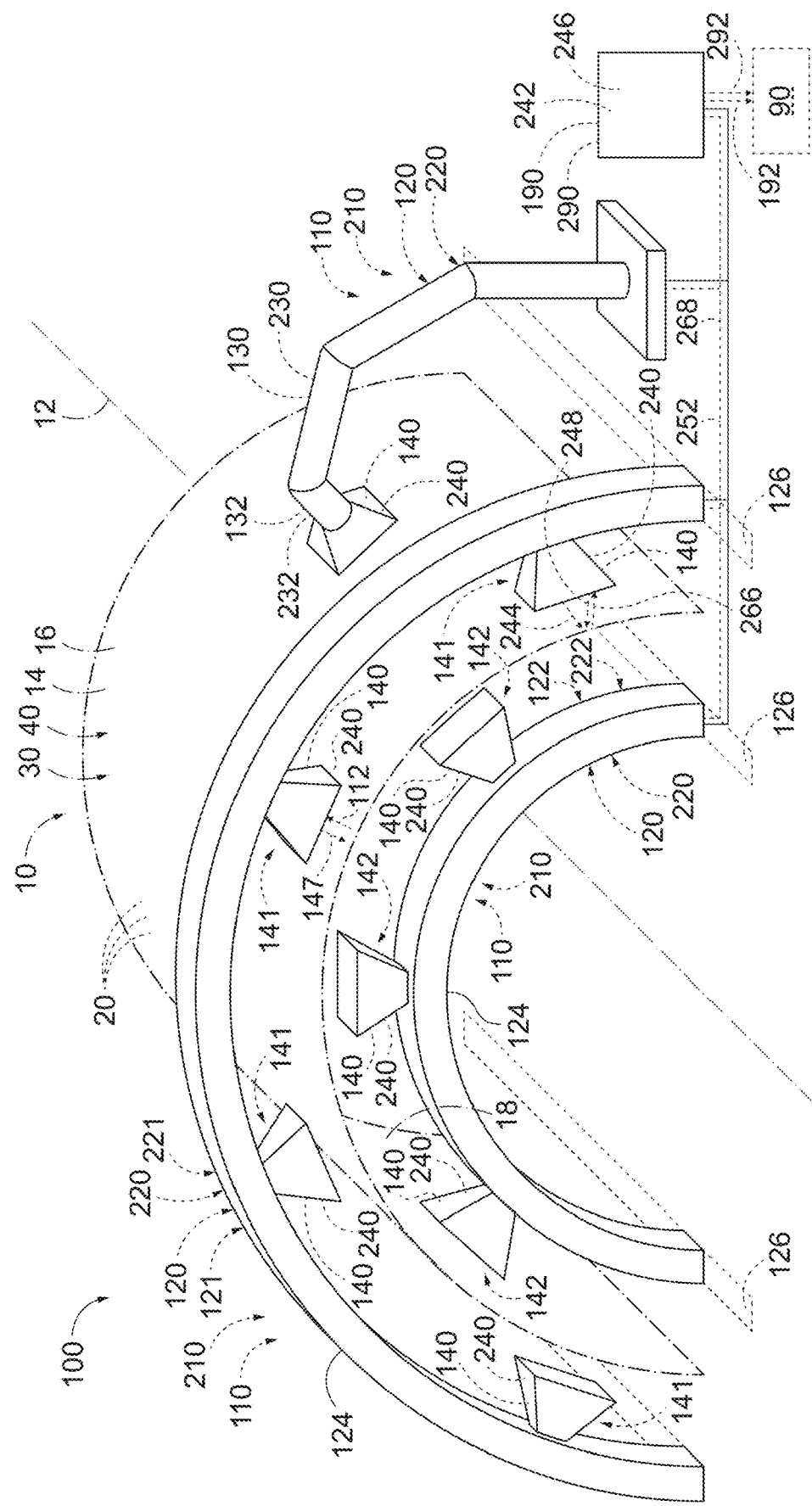
FIG. 1 is a schematic front side isometric view representing examples of non-destructive test systems positioned relative to an example of a test piece according to the present disclosure.

FIGS. 1-5 provide illustrative, non-exclusive examples of infrared thermography assemblies 110, of ultrasonic test assemblies 210, of non-destructive test systems 100 including infrared thermography assemblies 110 and ultrasonic test assemblies 210, and/or of methods 300 of performing non-destructive tests on test pieces 10, according to the present disclosure. Elements that serve a similar, or at least substantially similar, purpose are labeled with like numbers in each of FIGS. 1-5, and these elements may not be discussed in detail herein with reference to each of FIGS. 1-5. Similarly, all elements may not be labeled in each of FIGS. 1-5, but reference numerals associated therewith may be utilized herein for consistency. Elements, components, and/or features that are discussed herein with reference to one or more of FIGS. 1-5 may be included in and/or utilized with any of FIGS. 1-5 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

FIG. 1 schematically illustrates examples of non-destructive test systems 100 for performing non-destructive testing of a test piece 10, as discussed herein. In particular, and as discussed herein, non-destructive test systems 100 according to the present disclosure generally are configured to detect the presence of inconsistencies 20 within test piece 10, such as to ensure and/or confirm that test piece 10 is at least substantially free of defects during and/or subsequent to manufacture of test piece 10. As described in more detail herein, non-destructive test systems 100 and associated methods 300 according to the present disclosure are configured to enable non-destructive and/or non-contact measurement and/or testing of test piece 10. In particular, these systems and methods utilize a combination of infrared thermography techniques and ultrasonic inspection techniques to perform such testing with increased efficiency relative to prior art techniques.

As schematically illustrated in FIG. 1, a non-destructive test system 100 includes an infrared thermography assembly 110 and an ultrasonic test assembly 210. As discussed in more detail herein, infrared thermography assembly 110 is configured to test an infrared test region 30 of test piece 10 to detect inconsistencies 20 within infrared test region 30, while ultrasonic test assembly 210 is configured to test an ultrasonic test region 40 of test piece 10 to detect inconsistencies 20 within ultrasonic test region 40. In this manner, and as discussed in more detail herein, examples of operative use of non-destructive test system 100 to inspect test piece 10 utilize both non-contact infrared inspection techniques and non-contact ultrasonic inspection techniques, thus harnessing the respective strengths and benefits of each of these inspection techniques to inspect test piece 10 more thoroughly and/or efficiently relative to prior art methodologies. For example, while existing infrared thermography inspection techniques can inspect a test piece rapidly and without contacting the test piece, the efficacy and efficiency of infrared thermography inspection techniques often is limited by a thickness of the structure under test. By contrast, existing ultrasound inspection techniques enable testing to greater depths within the test piece relative to infrared thermography inspection techniques, but such ultrasonic inspection techniques often employ water-coupled ultrasonic excitations that necessitate time- and labor-intensive preparation of the test piece including taping of edges and plugging of holes, windows, etc. to limit undesired water ingress.

As used herein, the terms "during operative use," "during operative utilization," and the like are intended to refer to a configuration and/or instance in which non-destructive test system 100 is positioned relative to test piece 10 such that non-destructive test system 100 is capable of inspecting, and/or is actively inspecting, test piece 10 as described herein. However, such examples are not limiting, and it is additionally within the scope of the present disclosure that non-destructive test system 100 is not always operatively positioned relative to test piece 10. Stated differently, while various aspects, configurations, etc. of non-destructive test system 100 are described herein with reference to operative use of non-destructive test system 100 to inspect test piece 10, it is additionally within the scope of the present disclosure that such aspects, configurations, etc. also describe non-destructive test system 100 in the absence of test piece 10.

Non-destructive test system 100 may be configured to be operatively utilized in conjunction with any of a variety of test pieces 10. In some examples, test piece 10 includes a portion of an aircraft, such as a portion of a fuselage of an aircraft. Additionally or alternatively, in some examples, such as in the example of FIG. 1, test piece 10 is curved about a test piece axis 12. In some such examples, and as schematically illustrated in FIG. 1, test piece 10 is at least substantially axially symmetric about test piece axis 12, and/or is at least substantially cylindrical. Test piece 10 also may feature any of a variety of material constructions. In various examples, test piece 10 includes one or more laminate plies of a composite material, such as a carbon epoxy laminate material and/or any other composite material suitable for inspection by infrared thermography assembly 110 and/or by ultrasonic test assembly 210 as described herein.

Non-destructive test system 100 may be configured to detect any of a variety of forms of inconsistency 20 that may be present within test piece 10. Examples of inconsistencies 20 according to the present disclosure include a wrinkle, an impurity, a void, an inclusion, a porosity, a crack, a joint inconsistency, a bond discontinuity, a delamination, and/or corrosion. In some examples, inconsistency 20 is a defect that is associated with a manufacturing process of test piece 10, such as composite manufacturing process. Accordingly, non-destructive test systems 100 and associated methods 300 according to the present disclosure may be described as systems and/or methods to be utilized in conjunction with the manufacture of test piece 10 in the form of a composite structure, such as to ensure that test piece 10 is at least substantially free of inconsistencies 20 and/or other defects.

Infrared test region 30 and ultrasonic test region 40 may include and/or be any suitable respective regions of test piece 10, such as respective regions of test piece 10 that differ in dimension, thickness, material properties, etc. For example, and as discussed herein, infrared thermography assembly 110 of non-destructive test system 100 may be more suitable for inspection of relatively thin regions of test piece 10, while ultrasonic test assembly 210 may be more suitable for inspection of relatively thick regions of test piece 10. As examples, infrared thermography assembly 110 may be configured to detect inconsistencies 20 within test piece 10 at a depth of up to about 0.4 centimeters, while ultrasonic test assembly 210 may be configured to detect inconsistencies 20 within test piece 10 at a depth of up to about 3 centimeters. Additionally or alternatively, in an example in which test piece 10 includes a plurality of plies of a composite material, ultrasonic test assembly 210 may be configured to detect inconsistencies 20 within test piece 10 formed of a greater number of plies of the composite material than a region of test piece 10 that is tested by infrared thermography assembly 110. As an example, infrared thermography assembly 110 may be configured to detect inconsistencies 20 within a region of test piece 10 that is up to about 40 plies thick, while ultrasonic test assembly 210 may be configured to detect inconsistencies 20 within a region of test piece 10 that is more than about 40 plies thick. Accordingly, in some examples, an average thickness of test piece 10 within ultrasonic test region 40 is greater than an average thickness of test piece 10 within infrared test region 30.

As used herein, the term "thickness," as used to characterize a region of test piece 10, generally refers to a linear dimension across test piece 10, such as from a first side 16 of test piece 10 to a second side 18 of test piece 10 as schematically illustrated in FIG. 1. As used herein, the term "average thickness," as used to characterize test piece 10 and/or a region thereof, may refer to any of a variety of metrics characterizing test piece 10, such as a mean thickness across a surface area of test piece 10 (e.g., across first side 16 and/or across second side 18 of test piece 10), a median thickness across the surface area of test piece 10, and/or any other suitable statistical measure of the thickness of test piece 10.

Figure 2:
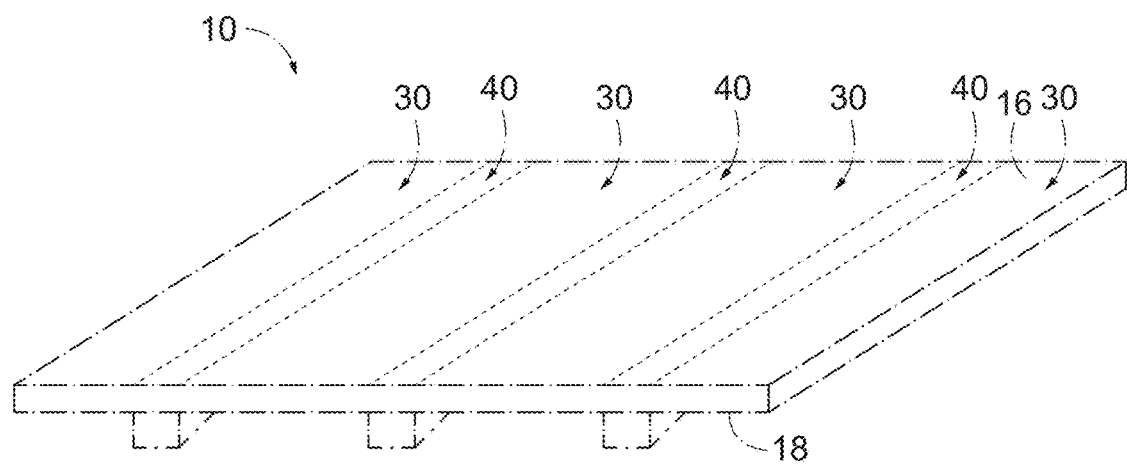
FIG. 2 is a schematic front side isometric view representing an example of a portion of a test piece that includes infrared test regions and ultrasonic test regions, according to the present disclosure.

FIG. 2 schematically illustrates a portion of an example of test piece 10 that varies in thickness. As a more specific example, FIG. 2 may be described as illustrating test piece 10 in the form of a portion of an aircraft fuselage that includes a plurality of spaced-apart elongate reinforcement structures, such as stringers, such that test piece 10 has an increased thickness (e.g., as measured between first side 16 and a second side 18 of the test piece) at the locations corresponding to (e.g., overlying and/or including) the reinforcement structures. In such examples, and as schematically illustrated in FIG. 2, infrared test region 30 may include the relatively thin regions of test piece 10, such as those regions that do not coincide with the elongate reinforcement structures, while ultrasonic test region 40 may include the relatively thick regions of test piece 10, such as those regions that coincide with the elongate reinforcement structures. In this manner, in some examples, and as schematically illustrated in FIG. 2, each of infrared test region 30 and/or ultrasonic test region 40 includes a respective plurality of regions that are spaced apart from one another and/or otherwise disconnected from one another.

In some examples, non-destructive test system 100 is configured to be utilized to test a test piece 10 in which infrared test region 30 is larger in area than ultrasonic test region 40, such as in the example of FIG. 2. Additionally or alternatively, in some examples, infrared test region 30 and ultrasonic test region 40 are at least partially overlapping. Stated differently, in some examples, infrared thermography assembly 110 and ultrasonic test assembly 210 each are configured to test and/or inspect a common region of test piece 10, such that this region of test piece 10 may be described as forming a portion of each of infrared test region 30 and ultrasonic test region 40. Such a configuration may be beneficial in an example in which a particular region of test piece 10 is to be tested by both infrared thermography assembly 110 and ultrasonic test assembly 210, such as to more thoroughly investigate the presence and/or properties of inconsistencies 20 within such a region.

In various examples, infrared thermography assembly 110 includes any of various suitable components for performing non-contact infrared thermography inspection of test piece 10. In some examples, and as schematically illustrated in FIG. 1, infrared thermography assembly 110 includes one or more thermography sensor modules 140, each of which is configured to receive infrared imaging data 112 from test piece 10. In some examples, and as schematically illustrated in FIG. 1, infrared thermography assembly 110 additionally includes one or more thermography support structures 120, each of which operatively supports a corresponding subset of thermography sensor modules 140 relative to test piece 10. More specifically, in such examples, each thermography support structure 120 is configured to selectively and operatively move and/or position the corresponding subset of thermography sensor modules 140 relative to test piece 10 to position each thermography sensor module 140 relative to test piece 10, such as to position each thermography sensor module 140 at a location corresponding to, and/or directed toward, a portion of infrared test region 30. In some examples, and as schematically illustrated in FIG. 1, infrared thermography assembly 110 additionally includes a thermography test controller 190 that is configured to at least partially control operation of infrared thermography assembly 110. In such examples, thermography test controller 190 is configured to generate a thermography test signal 192 based, at least in part, on infrared imaging data 112, as described herein.

Infrared thermography assembly 110 may utilize any of a variety of infrared inspection techniques that enable infrared thermography assembly 110 to test infrared test region 30 of test piece 10 without physically contacting test piece 10 with thermography sensor module(s) 140. In some examples, and as described herein, infrared thermography assembly 110 detects inconsistencies 20 via detection of local variations in thermal diffusivity or thermal conductivity at or beneath a surface of test piece 10, such as via active thermography techniques. Such active thermography techniques generally involve heating or cooling test piece 10 to create a difference between a temperature of test piece 10 and an ambient temperature and subsequently observing an infrared thermal signature that emanates from test piece 10 as test piece 10 returns to ambient temperature. In an example in which test piece 10 includes inconsistencies 20, such inconsistencies 20 may block the diffusion of heat from a surface of test piece 10 to an interior of test piece 10. In this manner, detection of any abnormalities and/or anomalies in the time-dependent cooling behavior of test piece 10 may serve as a probe of inconsistencies 20 within test piece 10.

Figure 3:
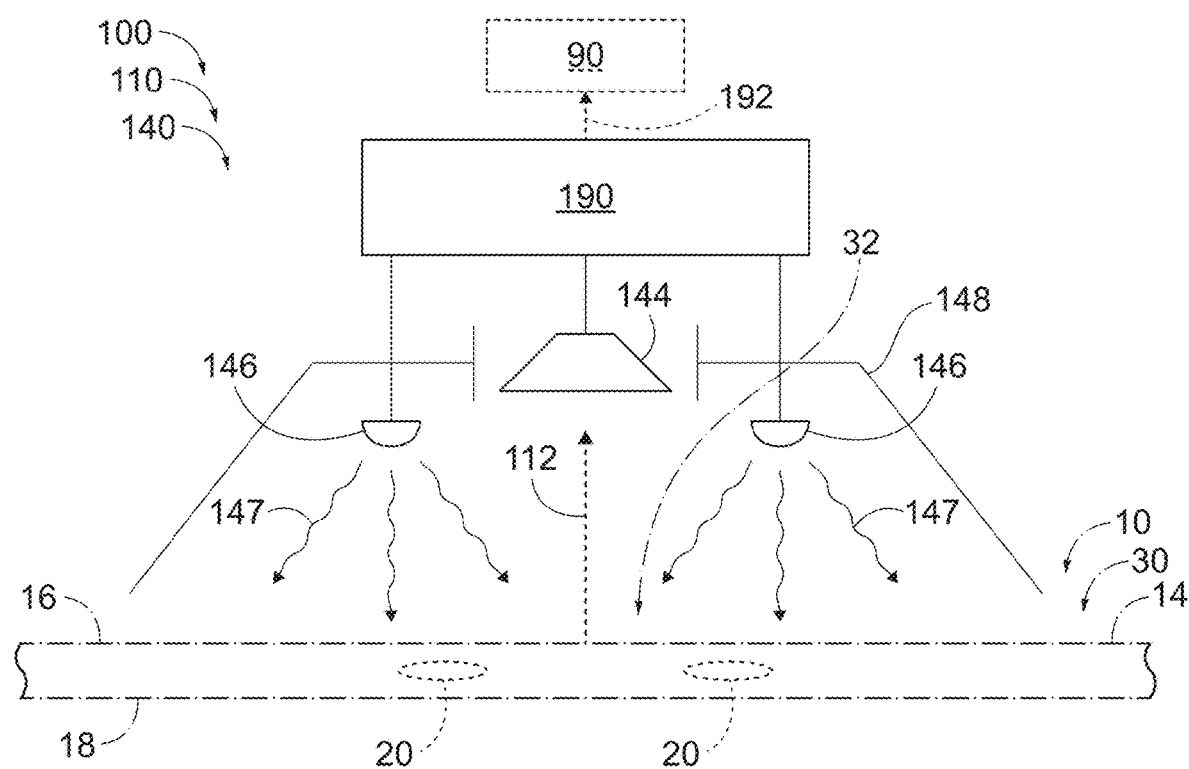
FIG. 3 is a schematic front elevation view representing an example of a portion of an infrared thermography assembly according to the present disclosure.

FIG. 3 schematically illustrates an example of a portion of infrared thermography assembly 110, such as an example of thermography sensor module 140. In some examples, and as schematically illustrated in FIG. 3, each thermography sensor module 140 includes an infrared camera 144 that is configured to receive infrared imaging data 112 from test piece 10, and infrared imaging data 112 is generated and transmitted (e.g., radiated) from test piece 10 responsive to thermal excitation by thermography sensor module 140. More specifically, in some examples, and as schematically illustrated in FIG. 3, thermography sensor module 140 additionally includes at least one thermal source 146 that is configured to transmit an applied thermal excitation 147 to a thermography inspection area 32 of test piece 10, such as may correspond to and/or be a field of view of infrared camera 144. In such examples, test piece 10 receives thermal energy upon absorption of at least a portion of applied thermal excitation 147, and test piece 10 subsequently releases at least a portion of the absorbed thermal energy by radiating infrared imaging data 112 toward infrared camera 144. Stated differently, in such examples, infrared imaging data 112 includes and/or is electromagnetic radiation, such as infrared radiation, that is emitted from test piece 10 responsive to applied thermal excitation 147.

In such examples, infrared camera 144 is configured to collect infrared imaging data 112 from thermography inspection area 32 over a dwell time interval to produce a cooling profile associated with thermography inspection area 32. As thermography inspection area 32 cools, infrared camera 144 monitors and records an image time sequence indicating a surface temperature of thermography inspection area 32, thereby creating a record of the changes in the surface temperature over time. More specifically, in such examples, infrared camera 144 collects and records infrared imaging data 112 for a period of time equal to the dwell time interval after transmitting applied thermal excitation 147 to thermography inspection area 32 such that the cooling profile represents a thermal relaxation of thermography inspection area 32 over the dwell time interval. In more specific examples, the cooling profile at least partially represents a temperature of thermography inspection area 32 as a function of time during the dwell time interval.

In this manner, thermography test signal 192 may be based, at least in part, on the cooling profile, such as via comparison of the cooling profile to a cooling profile that would be expected of a portion of test piece 10 that is free of inconsistencies 20. For example, if test piece 10 is free of inconsistencies 20, the thermal response of any point on a surface of test piece 10 during the dwell time interval may be expected to decay in such a manner that the natural logarithm of the time-dependent temperature response is well approximated by a straight line, and such that deviations from such behavior are indicative of the presence of inconsistencies 20. Thermography test signal 192 may represent the thermal response of thermography inspection area 32, and/or the presence of detected inconsistencies 20, in any of a variety of manners. Examples of thermography test signal 192 as based upon infrared imaging data 112 and/or the corresponding cooling profile include an alert indicating the presence of one or more inconsistencies 20 within thermography inspection area 32, an image depicting at least a portion of test piece 10 and/or one or more inconsistencies 20 within thermography inspection area 32, a plot representing the time-dependent temperature of thermography inspection area 32, and/or a report identifying inconsistency/inconsistencies 20 within thermography inspection area 32. In some examples, and as schematically illustrated in FIGS. 1 and 3, non-destructive test system 100 additionally includes a user interface 90 for conveying thermography test signal 192 to a user, and thermography test controller 190 is configured to transmit thermography test signal 192 to user interface 90 to be received by the user. In such examples, user interface 90 may include any of a variety of devices for conveying thermography test signal 192 to the user, examples of which include a visual display, a speaker, a printer, etc.

Infrared camera 144 and thermal source 146 each may include and/or be any of a variety of suitable devices. In some examples, infrared camera 144 includes and/or is a focal plane array device that is configured to perform as a spectral radiometer to receive infrared imaging data 112. Additionally or alternatively, in some examples, each thermal source 146 includes and/or is a light source, such as a flash lamp, such that applied thermal excitation 147 includes an emission of light from the light source. In some examples, and as schematically illustrated in FIG. 3, each thermography sensor module 140 includes a hood 148 that at least substantially encloses infrared camera 144 and each thermal source 146. In such examples, hood 148 may ensure that applied thermal excitation 147 transmitted by each thermal source 146 is at least substantially restricted to reaching thermography inspection area 32 and/or the field of view of infrared camera 144. Additionally or alternatively, in such examples, hood 148 may ensure that infrared camera 144 receives infrared imaging data 112 primarily and/or only from thermography inspection area 32 that has received applied thermal excitation 147 from thermal source(s) 146. In some such examples, hood 148 may be described as at least partially defining thermography inspection area 32.

As described above, thermography inspection area 32 generally represents an area of test piece 10 corresponding to a field of view of infrared camera 144 and/or an areal extent of applied thermal excitation 147, which in turn may be at least partially defined by hood 148. Accordingly, each iteration of inspecting test piece 10 with thermography sensor module 140 as described above (e.g., collecting infrared imaging data 112 over the dwell time interval) produces information regarding thermography inspection area 32, which may be large in area relative to a measurement resolution needed to identify a location of inconsistency 20. As an example, thermography inspection area 32 may have an area that is about 0.25 square meters, while it may be desirable to locate inconsistency 20 within test piece 10 to a precision of about 0.25 square centimeters. In some examples, the effective inspection resolution provided by thermography sensor module 140 may be enhanced by repeating the inspection iterations for overlapping thermography inspection areas 32. Additionally or alternatively, in some examples, and as described herein, the information provided by infrared thermography assembly 110 is supplemented by the relatively fine-scale inspection resolution offered by ultrasonic test assembly 210.

The foregoing discussion of the operation of infrared thermography assembly 110 generally relates to an example in which a given (e.g., a particular) thermography sensor module 140 inspects a given (e.g., a particular) thermography inspection area 32 of test piece 10. During operative use of non-destructive test system 100, infrared thermography assembly 110 generally is configured to perform (e.g., repeat) such thermographic inspection across an area of test piece 10 such that infrared test region 30 includes and/or consists of a plurality of distinct thermography inspection areas 32. Accordingly, and as discussed, each thermography support structure 120 of infrared thermography assembly 110 is configured to move and/or position each corresponding subset of thermography sensor modules 140 relative to test piece 10 in order to inspect an entirety of infrared test region 30.

Each thermography support structure 120 may include any of a variety of structures and/or configurations for moving thermography sensor module(s) 140 relative to test piece 10. In some examples, and as schematically illustrated in FIG. 1, at least one thermography support structure 120 supports a corresponding plurality of thermography sensor modules 140 that collectively form an array that at least substantially spans test piece 10. Stated differently, in such examples, thermography support structure 120 supports a plurality of thermography sensor modules 140 that are distributed along a spatial extent (e.g., a length) of thermography support structure 120 such that the plurality of thermography sensor modules 140 are distributed along a corresponding spatial extent of test piece 10 during operative use of non-destructive test system 100. In some such examples, the plurality of thermography sensor modules 140 are distributed such that the respective thermography inspection areas 32 of each of the plurality of thermography sensor modules 140 at least substantially cover a continuous region of test piece 10, such as a strip of first side 16 or of second side 18 of test piece 10 that corresponds to a position of thermography support structure 120.

Each thermography support structure 120 is configured to move and/or position the corresponding thermography sensor module(s) 140 in any of a variety of manners. In some examples, and as schematically illustrated in FIG. 1, at least one thermography support structure 120 includes a moving platform 124, such as a gantry, that is configured to move along a predetermined path 126 relative to test piece 10. In such examples, predetermined path 126 may be defined in any suitable manner, such as by a static track along which moving platform 124 travels and/or by a predetermined routine that is followed by moving platform 124. Additionally or alternatively, in some examples, and as further schematically illustrated in FIG. 1, at least one thermography support structure 120 includes a thermography end effector 132 and a thermography robotic arm 130 that supports thermography end effector 132. In such examples, thermography end effector 132 supports the corresponding thermography sensor module(s) 140, and thermography robotic arm 130 is configured to move thermography end effector 132 relative to test piece 10 to at least partially position the corresponding thermography sensor module(s) 140 relative to test piece 10. In some such examples, thermography end effector 132 is configured to be selectively and repeatedly coupled to and removed from thermography robotic arm 130, such as to enable the corresponding thermography sensor module(s) 140 to be selectively removed from and/or operatively coupled to thermography robotic arm 130.

In some examples, and as schematically illustrated in FIG. 1, infrared thermography assembly 110 includes a plurality of thermography support structures 120, each of which supports corresponding thermography sensor modules 140. In some such examples, and as schematically illustrated in FIG. 1, the plurality of thermography support structures 120 may be described as including a first thermography support structure 121 that supports a first sensor subset 141 of thermography sensor modules 140 as well as a second thermography support structure 122 that supports a second sensor subset 142 of thermography sensor modules 140. In some such examples, and as schematically illustrated in FIG. 1, first thermography support structure 121 positions first sensor subset 141 to test first side 16 of test piece 10, while second thermography support structure 122 positions second sensor subset 142 to test second side 18 of test piece 10. In this manner, performing thermographic testing of test piece 10 with first sensor subset 141 and with second sensor subset 142 at least partially concurrently enables a more efficient inspection of test piece 10. For example, testing opposite sides of test piece 10 at least partially concurrently may enable infrared thermography assembly 110 to test an infrared test region 30 that exhibits a greater thickness relative to a configuration in which infrared thermography assembly 110 tests only a single side (e.g., first side 16 or second side 18) of test piece 10.

Additional examples of infrared thermography assemblies 110, of thermography sensor modules 140, and/or of aspects and components thereof are disclosed in U.S. Pat. No. 9,645,012, the complete disclosure of which is hereby incorporated by reference.

In various examples, non-destructive test system 100 additionally includes any of various suitable components for performing non-contact ultrasonic inspection of test piece 10. In some examples, and as schematically illustrated in FIG. 1, ultrasonic test assembly 210 includes one or more ultrasonic sensor support structures 220 supported by one or more ultrasonic sensor subassemblies 240. More specifically, in such examples, each ultrasonic sensor support structure 220 operatively supports a corresponding subset of ultrasonic sensor subassemblies 240 and is configured to selectively and operatively move and/or position the corresponding subset of ultrasonic sensor subassemblies 240 relative to test piece 10. In some examples, and as described in more detail herein, each ultrasonic sensor subassembly 240 is configured to inspect at least a portion of test piece 10 using ultrasonic vibrations within test piece 10 as a probe of inconsistencies 20 within probe test piece 10. In some examples, and as schematically illustrated in FIG. 1, ultrasonic test assembly 210 additionally includes an ultrasonic test controller 290 that is configured to at least partially control operation of ultrasonic test assembly 210. In such examples, ultrasonic test controller 290 is configured to generate an ultrasonic test signal 292, as described herein, and/or to transmit ultrasonic test signal 292 to user interface 90.

Figure 4:
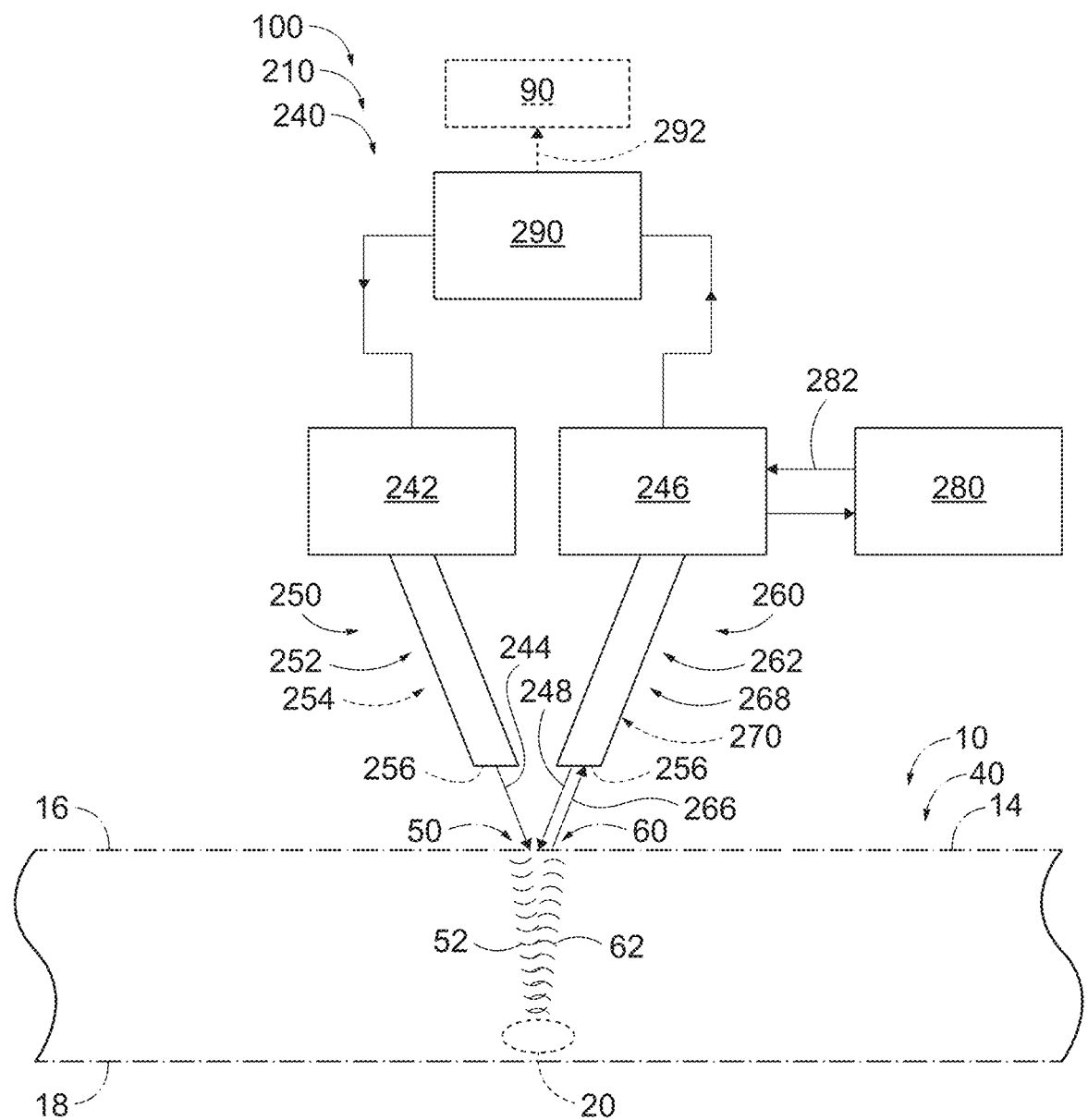
FIG. 4 is a schematic front elevation view representing examples of ultrasonic sensor subassemblies according to the present disclosure.

FIG. 4 schematically illustrates examples of ultrasonic sensor subassembly 240 positioned relative to an example of test piece 10. As schematically illustrated in FIG. 4, each ultrasonic sensor subassembly 240 includes a respective excitation module 250 and a respective detector module 260. In such examples, and as schematically illustrated in FIG. 4, excitation module 250 of each ultrasonic sensor subassembly 240 is configured to produce an ultrasonic beam 52 that propagates within test piece 10, such as by delivering energy to a respective ultrasonic generation location 50 on an external surface 14 of test piece 10.

Each excitation module 250 may be configured to produce ultrasonic beam 52 within test piece 10 in any of a variety of manners. In some examples, and as schematically illustrated in FIGS. 1 and 4, ultrasonic test assembly 210 additionally includes an excitation generation light source 242 that is configured to generate an excitation generation light 244 (shown in FIG. 4), such as coherent light and/or laser light, for generating ultrasonic beam 52. More specifically, in some such examples, and as schematically illustrated in FIG. 4, excitation module 250 of each ultrasonic sensor subassembly 240 is configured to transmit excitation generation light 244 to the respective ultrasonic generation location 50 on an external surface 14 of test piece 10 in order to produce ultrasonic beam 52 that propagates within test piece 10. Stated differently, in such examples, excitation module 250 is configured to deliver excitation generation light 244 to ultrasonic generation location 50 such that excitation generation light 244 generates ultrasonic beam 52 in the form of an acoustic and/or mechanical vibration within test piece 10. While the present disclosure generally relates to examples in which excitation generation light 244 is coherent light, such as laser light, this is not required, and it is additionally within the scope of the present disclosure that excitation generation light 244 may include and/or be any form of electromagnetic radiation that is suitable to generate ultrasonic beam 52.

As schematically illustrated in FIG. 1, excitation generation light source 242 may be common to (e.g., commonly utilized by, and/or associated with the operation of each of) each ultrasonic sensor subassembly 240 of ultrasonic test assembly 210. Stated differently, in such examples, ultrasonic test assembly 210 may include one or more excitation generation light sources 242 that each are configured to supply excitation generation light 244 to each of a plurality of distinct ultrasonic sensor subassemblies 240 and/or to every ultrasonic sensor subassembly 240 of ultrasonic test assembly 210. In other examples, and as additionally schematically illustrated in FIG. 4, each ultrasonic sensor subassembly 240 of ultrasonic test assembly 210 includes and/or utilizes a respective distinct excitation generation light source 242.

Ultrasonic generation location 50 may be at least partially defined in terms of a spot size formed by excitation generation light 244 upon external surface 14 of test piece 10. In some examples, ultrasonic generation location 50 is characterized by a spot size that is at least 0.1 millimeters (mm), at least 0.5 mm, at least 1 mm, at least 5 mm, at most 10 mm, at most 7 mm, at most 2 mm, at most 0.7 mm, and/or at most 0.2 mm. In some examples, the selected range for the spot size of ultrasonic generation location 50 is selected such that a path formed by excitation generation light 244 as excitation generation light 244 scans across test piece 10 has a width that is sufficiently narrow to allow fine-scale features of test piece 10 to be characterized.

In some examples, ultrasonic beam 52 includes and/or is a wide-band ultrasonic signal. Specifically, in such examples, a frequency spectrum of ultrasonic beam 52 includes and/or extends across a range of frequencies with a width that is at least 50% of a characteristic frequency (e.g., a median frequency and/or a frequency of maximum power) of ultrasonic beam 52. In some more specific examples, the characteristic frequency of ultrasonic beam 52 is at least 100 kilohertz (kHz), at least 300 kHz, at least 500 kHz, at least 1 Megahertz (MHz), at least 3 MHz, at least 5 MHz, at least 10 MHz, at least 30 MHz, at most 50 MHz, at most 20 MHz, at most 7 MHz, at most 2 MHz, and/or at most 700 kHz. In some examples, a frequency and/or frequency spectrum of ultrasonic beam 52 is at least partially based upon one or more material properties of test piece 10.

As schematically illustrated in FIG. 4, as ultrasonic beam 52 propagates within test piece 10, ultrasonic beam 52 may reflect off of features within test piece 10 such as edges, surfaces, and/or inconsistencies 20 to produce a reflected vibration 62 that propagates toward external surface 14 of test piece 10. Accordingly, detection and/or measurement of reflected vibration 62 may serve a probe of an internal structure of test piece 10, such as to reveal the existence and/or identity of inconsistencies 20 within test piece 10. In particular, in an example that utilizes excitation generation light 244 to produce ultrasonic beam 52, excitation generation light 244 generally is configured such that reflected vibration 62 is formed within test piece 10 without causing and/or producing any undesired inconsistencies 20 within test piece 10.

In some examples, ultrasonic test assembly 210 is configured to detect inconsistencies 20 within test piece 10 via non-contact detection and/or measurement of reflected vibrations 62 generated responsive to excitation generation light 244. In particular, in such examples, and with reference to FIG. 4, each detector module 260 is configured to detect reflected vibration 62 at a respective ultrasonic detect location 60 on external surface 14 of test piece 10, and ultrasonic test controller 290 is configured to generate an ultrasonic test signal 292 that is at least partially based on reflected vibration 62.

Each ultrasonic sensor subassembly 240 may be configured to detect reflected vibration 62 in any of a variety of manners, such as via a non-contact technique that includes detecting reflected vibration 62 using coherent light. In some examples, and as schematically illustrated in FIGS. 1 and 4, ultrasonic test assembly 210 additionally includes a coherent receive light source 246 that is configured to generate a coherent receive light 248 (shown in FIG. 4), such as laser light. In such examples, and as schematically illustrated in FIG. 4, each ultrasonic sensor subassembly 240 includes a respective ultrasonic detector 262 that is configured to transmit coherent receive light 248 to ultrasonic detect location 60 and to receive a reflected receive light signal 266 that includes a portion of coherent receive light 248 that is reflected by test piece 10. That is, in such examples, as reflected vibration 62 reaches external surface 14 of test piece 10 within ultrasonic detect location 60, reflected vibration 62 operates to modulate and/or otherwise affect the portion of coherent receive light 248 that is reflected from test piece 10 as reflected receive light signal 266. In this manner, detection and/or analysis of a modulation of reflected receive light signal 266 serves to at least partially characterize reflected vibration 62, thus enabling the detection and/or characterization of inconsistencies 20 within test piece 10 that generate and/or modulate reflected vibration 62. Accordingly, in such examples, ultrasonic test signal 292 is at least partially based upon reflected receive light signal 266, which in turn is at least partially based upon an internal structure of test piece 10 and/or inconsistencies 20 within test piece 10.

In some examples, and as schematically illustrated in FIG. 4, ultrasonic sensor subassembly 240 is configured such that ultrasonic generation location 50 and ultrasonic detect location 60 are at least partially overlapping. Such a configuration may facilitate the detection of inconsistencies 20 within test piece 10 at a location corresponding to (e.g., directly beneath) ultrasonic generation location 50. However, this is not required of all examples of ultrasonic sensor subassembly 240, and it is additionally within the scope of the present disclosure that ultrasonic sensor subassembly 240 is configured such that ultrasonic detect location 60 is spaced apart from ultrasonic generation location 50 by an ultrasonic test offset distance, as measured along external surface 14 of test piece 10.

Ultrasonic test signal 292 may represent reflected receive light signal 266, and/or the presence of any inconsistencies 20 detected within test piece 10, in any of a variety of manners. Examples of ultrasonic test signal 292 as based upon reflected receive light signal 266 include an alert indicating the presence of one or more inconsistencies 20 within ultrasonic test region 40, an image depicting at least a portion of test piece 10 and/or one or more inconsistencies 20 within ultrasonic test region 40, and/or a report identifying inconsistency/inconsistencies 20 within ultrasonic test region 40. In some examples, and as schematically illustrated in FIGS. 1 and 4, thermography test controller 190 is configured to transmit ultrasonic test signal 292 to user interface 90 to be received by the user.

Excitation generation light 244 and coherent receive light 248 each may include and/or be any of a variety of forms of light. In some examples, excitation generation light 244 and/or coherent receive light 248 includes and/or is laser light, such as laser light that is at least substantially monochromatic. Accordingly, in some such examples, each of excitation generation light source 242 and/or coherent receive light source 246 includes a laser, a gas laser, a carbon dioxide gas laser, a solid state laser, a diode laser, and/or an Nd:YAG laser. In other examples, one or both of excitation generation light source 242 and/or coherent receive light source 246 includes and/or is a superluminescent diode. In some examples, coherent receive light 248 has a different wavelength (e.g., a different characteristic wavelength and/or a different peak wavelength) than excitation generation light 244, such as may facilitate isolating and/or differentiating reflected receive light signal 266 from a reflection of excitation generation light 244 from test piece 10.

In some examples, excitation generation light source 242 is configured to generate excitation generation light 244 in the form of a pulsed laser beam. In more specific examples, excitation generation light source 242 is configured to generate the pulsed laser beam with a pulse repetion rate that is at least 5 kHz, at least 10 kHz, at least 50 kHz, at least 100 kHz, at least 500 kHz, at most 700 kHz, at most 200 kHz, at most 70 kHz, at most 20 kHz, and/or at most 7 kHz. The pulse repetion rate may be selected to be sufficiently high to allow the rate at which excitation generation light 244 is scanned across test piece 10 to be within selected tolerances. In particular, configuring excitation generation light 244 to exhibit a high pulse repetion rate allows for a correspondingly high rate at which excitation generation light 244 may be scanned across test piece 10. Additionally or alternatively, in some examples, excitation generation light 244 includes a plurality (e.g., a series) of laser pulses, each of which has an energy that is at least 0.1 microjoules (µJ), at least 1 µJ, at least 10 µJ, at least 100 µJ, at least 1,000 µJ, at least 10,000 µJ, at most 50,000 µJ at most 5,000 µJ, at most 500 µJ, at most 50 µJ at most 5 µJ, and/or at most 0.5

µJ. In some examples, excitation generation light 244 is generated such that the energy per pulse is within a range that is selected to allow ultrasonic beam 52 to be formed in test piece 10 without generating inconsistencies 20 within test piece 10.

Ultrasonic test assembly 210 may be configured to convey excitation generation light 244 and/or coherent receive light 248 to test piece 10 in any of a variety of manners. In some examples, and as schematically illustrated in FIGS. 1 and 4, ultrasonic test assembly 210 includes one or more generation optical waveguides 252 that each are configured to convey excitation generation light 244 from excitation generation light source 242 to excitation module 250 of at least one ultrasonic sensor subassembly 240. In some examples, and as schematically illustrated in FIG. 1, excitation generation light source 242 is a centralized and/or common excitation generation light source 242 that supplies excitation generation light 244 to each of a plurality of ultrasonic sensor subassemblies 240, and ultrasonic test assembly 210 includes a plurality of generation optical waveguides 252 that convey excitation generation light 244 to respective ultrasonic sensor subassemblies 240. In some other examples, and as schematically illustrated in FIG. 4, at least one ultrasonic sensor subassembly 240 of ultrasonic test assembly 210 includes a respective excitation generation light source 242 and a respective generation optical waveguide 252.

Each generation optical waveguide 252 may include and/or be any of a variety of structures for conveying excitation generation light 244. In some examples, and as schematically illustrated in FIG. 4, generation optical waveguide 252 and/or excitation module 250 of ultrasonic sensor subassembly 240 includes and/or is a generation optical fiber 254. In some such examples, and as schematically illustrated in FIG. 4, excitation module 250 of ultrasonic sensor subassembly 240 includes a terminal end 256 of generation optical fiber 254, such as an end of generation optical fiber 254 that terminates to free space such that excitation generation light 244 exits generation optical fiber 254 into free space via terminal end 256. In some examples, generation optical fiber 254 is a single optical fiber that conveys excitation generation light 244. In other examples, generation optical fiber 254 includes and/or refers to a bundle (e.g., a bundled plurality) of optical fibers that collectively convey excitation generation light 244. In such examples, terminal end 256 of generation optical fiber 254 may refer to the collection of the terminal ends of each of the bundle of optical fibers.

Similarly, in some examples, and as schematically illustrated in FIGS. 1 and 4, ultrasonic test assembly 210 includes one or more receive optical waveguides 268 that each are configured to convey coherent receive light 248 from coherent receive light source 246 toward and/or to ultrasonic detect location 60. In some examples, and as schematically illustrated in FIG. 1, coherent receive light source 246 is a centralized and/or common coherent receive light source 246 that supplies coherent receive light 248 to each of a plurality of ultrasonic sensor subassemblies 240, and ultrasonic test assembly 210 includes a plurality of receive optical waveguides 268 that convey coherent receive light 248 to respective ultrasonic sensor subassemblies 240. In some other examples, and as schematically illustrated in FIG. 4, at least one ultrasonic sensor subassembly 240 of ultrasonic test assembly 210 includes a respective coherent receive light source 246 and a respective receive optical waveguide 268.

Each receive optical waveguide 268 may include and/or be any of a variety of structures for conveying coherent receive light 248. In some examples, and as schematically illustrated in FIG. 4, receive optical waveguide 268 and/or ultrasonic detector 262 of ultrasonic sensor subassembly 240 includes and/or is a receive optical fiber 270. In some such examples, and as schematically illustrated in FIG. 4, ultrasonic detector 262 of ultrasonic sensor subassembly 240 includes terminal end 256 of receive optical fiber 270, such as an end of receive optical fiber 270 that terminates to free space such that coherent receive light 248 exits receive optical fiber 270 into free space via terminal end 256. In some examples, receive optical fiber 270 is a single optical fiber that conveys coherent receive light 248. In other examples, receive optical fiber 270 includes and/or refers to a bundle (e.g., a bundled plurality) of optical fibers that collectively convey coherent receive light 248. In such examples, terminal end 256 of receive optical fiber 270 may refer to the collection of the terminal ends of each of the bundle of optical fibers.

In some examples, ultrasonic sensor subassembly 240 utilizes a coherence of coherent receive light 248 to generate ultrasonic test signal 292 based upon reflected receive light signal 266. In some such examples, and as schematically illustrated in FIG. 4, ultrasonic test assembly 210 includes an interferometer system 280 that is configured to generate an interferometer signal 282 at least partially based upon coherent receive light 248 and reflected receive light signal 266. More specifically, in such examples, interferometer system 280 generally is configured to compare coherent receive light 248 and reflected receive light signal 266, such as to compare a relative phase and/or magnitude of coherent receive light 248 and reflected receive light signal 266, to produce a measurement and/or representation of reflected vibration 62. In more specific examples, interferometer system 280 is configured to detect a displacement, a deflection, a surface velocity, and/or a vibration of test piece 10 (and/or external surface 14 thereof) at ultrasonic detect location 60 corresponding to reflected vibration 62. In all such examples that utilize interferometer system 280, ultrasonic test controller 290 is configured to generate ultrasonic test signal 292 at least partially based on interferometer signal 282. Interferometer system 280 may include and/or be any of a variety of suitable interferometer configurations, such as a fiber-optic modified Sagnac interferometer.

While FIG. 4 schematically illustrates an example in which ultrasonic sensor subassembly 240 includes a single respective excitation module 250, this is not required, and it is additionally within the scope of the present disclosure that ultrasonic sensor subassembly 240 (e.g., a particular ultrasonic sensor subassembly 240 of ultrasonic test assembly 210) includes a plurality of excitation modules 250. In some such examples, the plurality of excitation modules 250 transmits excitation generation light 244 to a corresponding plurality of ultrasonic generation locations 50 that collectively define an ultrasonic test pattern. In such examples, the ultrasonic test pattern may assume any of a variety of forms, shapes, and/or configurations on test piece 10, examples of which include a line, a polygon, a rectangle, an ellipse, and/or a circle. In some examples, the plurality of excitation modules 250 of ultrasonic sensor subassembly 240 are configured to transmit respective excitation generation lights 244 that have distinct wavelengths.

Similarly, while FIG. 4 schematically illustrates an example in which ultrasonic sensor subassembly 240 includes a single ultrasonic detector 262, this is not required, and it is additionally within the scope of the present disclosure that ultrasonic sensor subassembly 240 (e.g., a particular ultrasonic sensor subassembly 240 of ultrasonic test assembly 210) includes a plurality of ultrasonic detectors 262. In some such examples, the plurality of ultrasonic detectors 262 may be configured to transmit coherent receive light 248 to a portion of test piece 10 corresponding to ultrasonic test pattern 42. Additionally or alternatively, the plurality of ultrasonic detectors 262 may be configured to transmit coherent receive light 248 to a corresponding plurality of respective ultrasonic detect locations 60 that in turn correspond to a single (or a smaller plurality of) ultrasonic generation locations 50. In some such examples, the plurality of respective ultrasonic detect locations 60 are positioned relative to each ultrasonic generation location 50 to detect surface waves corresponding to the respective reflected vibration 62, shear waves corresponding to the respective reflected vibration 62, and/or longitudinal waves corresponding to the respective reflected vibration 62.

Additional examples of ultrasonic test assemblies 210, of ultrasonic sensor subassemblies 240, and/or of aspects and components thereof are disclosed in U.S. Pat. No. 9,625,423 and in U.S. Patent Publication No. 2017/0248551, the complete disclosures of which are hereby incorporated by reference.

In some examples, and as schematically illustrated in FIG. 1, ultrasonic test assembly 210 includes a plurality of ultrasonic sensor support structures 220 that support respectively corresponding ultrasonic sensor subassemblies 240. In some such examples, and as schematically illustrated in FIG. 1, the plurality of ultrasonic sensor support structures 220 may be described as including a first ultrasonic sensor support structure 221 that supports a first ultrasonic sensor subset of ultrasonic sensor subassemblies 240 as well as a second ultrasonic sensor support structure 222 that supports a second ultrasonic sensor subset of ultrasonic sensor subassemblies 240. In some such examples, first ultrasonic sensor support structure 221 and second ultrasonic sensor support structure 222 are configured to move and/or position the first ultrasonic sensor subset and the second ultrasonic sensor subset at least partially independent of one another. In some such examples, and as schematically illustrated in FIG. 1, first ultrasonic sensor support structure 221 positions the first ultrasonic sensor subset to test first side 16 of test piece 10, while second ultrasonic sensor support structure 222 positions the second ultrasonic sensor subset to test second side 18 of test piece 10. In this manner, performing ultrasonic testing of test piece 10 with the first ultrasonic sensor subset and the second ultrasonic sensor subset at least partially concurrently enables a more efficient inspection of test piece 10. For example, testing opposite sides of test piece 10 at least partially concurrently may enable ultrasonic test assembly 210 to test an ultrasonic test region 40 that exhibits a greater thickness relative to a configuration in which ultrasonic test assembly 210 tests only a single side (e.g., first side 16 or second side 18) of test piece 10.

In some examples, and as further schematically illustrated in FIG. 1, at least one ultrasonic sensor support structure 220 includes an ultrasonic sensor end effector 232 and an ultrasonic sensor robotic arm 230 that supports ultrasonic sensor end effector 232. In such examples, ultrasonic sensor end effector 232 supports the corresponding ultrasonic sensor subassembly(ies) 240, and ultrasonic sensor robotic arm 230 is configured to move ultrasonic sensor end effector 232 relative to test piece 10 to at least partially position the corresponding ultrasonic sensor subassembly(ies) 240 relative to test piece 10. In some such examples, ultrasonic sensor end effector 232 is configured to be selectively and repeatedly coupled to and removed from ultrasonic sensor robotic arm 230, such as to enable the corresponding thermography sensor module(s) 140 to be selectively removed from and/or operatively coupled to thermography robotic arm 130.

In some examples, and as schematically illustrated in FIG. 1, infrared thermography assembly 110 and ultrasonic test assembly 210 share one or more structures, such as one or more support structures for positioning components of infrared thermography assembly 110 and of ultrasonic test assembly 210 relative to test piece 10. In some such examples, and as schematically illustrated in FIG. 1, at least one thermography support structure 120 includes and/or is at least a portion of a corresponding ultrasonic sensor support structure 220. Additionally or alternatively, in some examples, at least one ultrasonic sensor support structure 220 includes and/or is at least a portion of a corresponding thermography support structure 120. Stated differently, in some examples, thermography support structure and ultrasonic sensor support structure 220 refer to a common (e.g., the same) structure that supports one or more thermography support structures 120 as well as one or more ultrasonic sensor subassemblies 240 according to the present disclosure. Similarly, in some examples, ultrasonic sensor robotic arm 230 includes and/or is at least a portion of thermography robotic arm 130, and/or vice versa. Stated differently, in some examples, thermography robotic arm 130 and ultrasonic sensor robotic arm 230 refer to a common (e.g., the same) structure that supports one or more thermography support structures 120 as well as one or more ultrasonic sensor subassemblies 240 according to the present disclosure.

While the present disclosure generally relates to examples in which ultrasonic test assembly 210 and/or ultrasonic sensor subassembly 240 is configured to detect inconsistencies 20 within test piece 10 via non-contact testing and/or utilizing an excitation light, such as coherent light, this is not required of all examples of non-destructive test system 100. For example, it also is within the scope of the present disclosure that ultrasonic test assembly 210 may utilize and/or employ any of a variety of ultrasonic testing routines and/or methodologies, examples of which include air-coupled ultrasonic testing, water-coupled ultrasonic testing, etc., such as may be selected according to the constraints and requirements of a particular test case.

In some examples, and as schematically illustrated in FIG. 1, ultrasonic test controller 290 includes at least a portion of thermography test controller 190, and/or vice versa. In more specific examples, thermography test controller 190 and ultrasonic test controller 290 are a common (e.g., the same) controller. Thermography test controller 190 and/or ultrasonic test controller 290 each may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure. Additionally or alternatively, thermography test controller 190 and/or ultrasonic test controller 290 each may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Figure 5A:
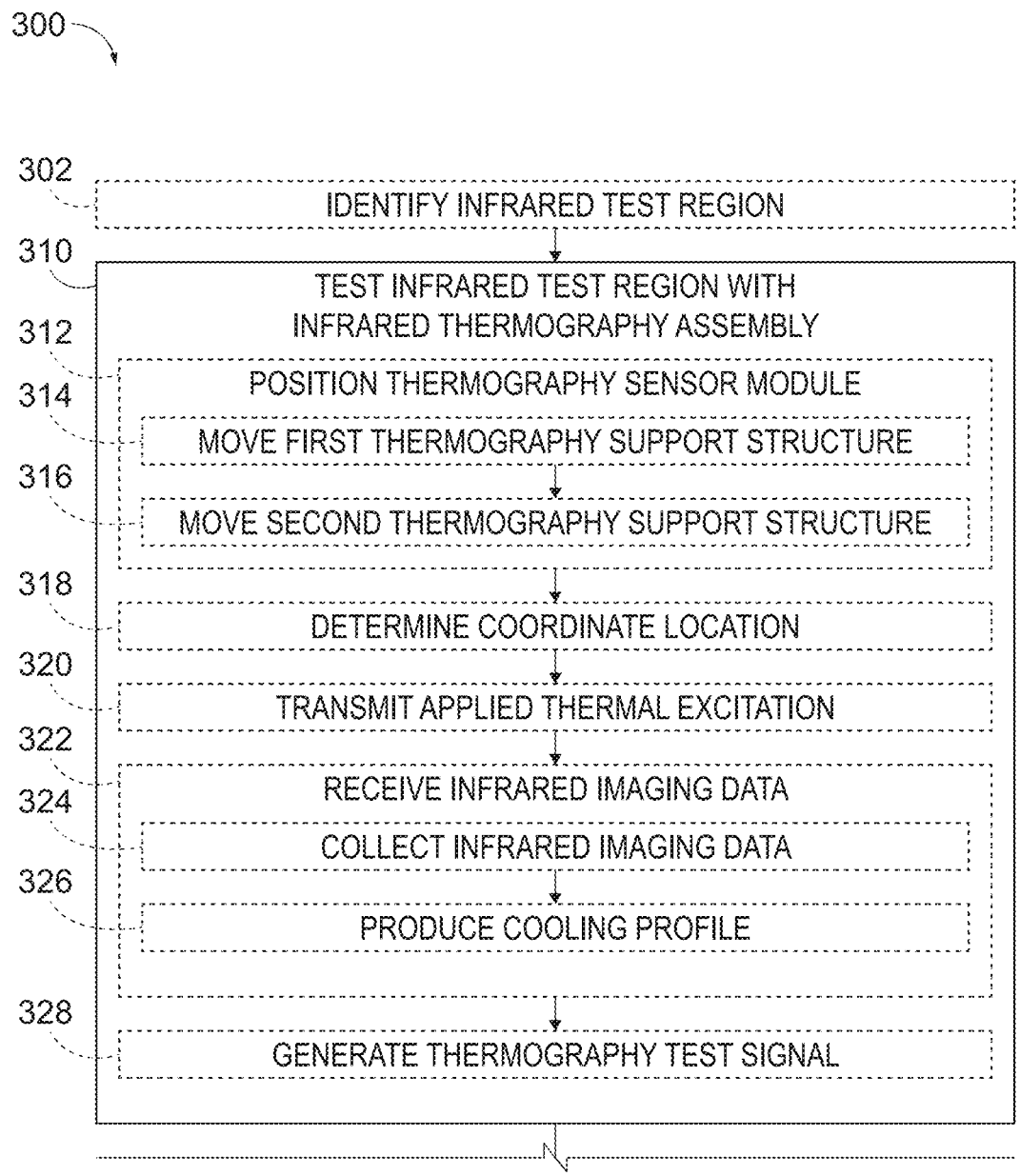
FIG. 5A is a flowchart depicting examples of methods, according to the present disclosure, of performing a non-destructive test on a test piece.
Figure 5B:
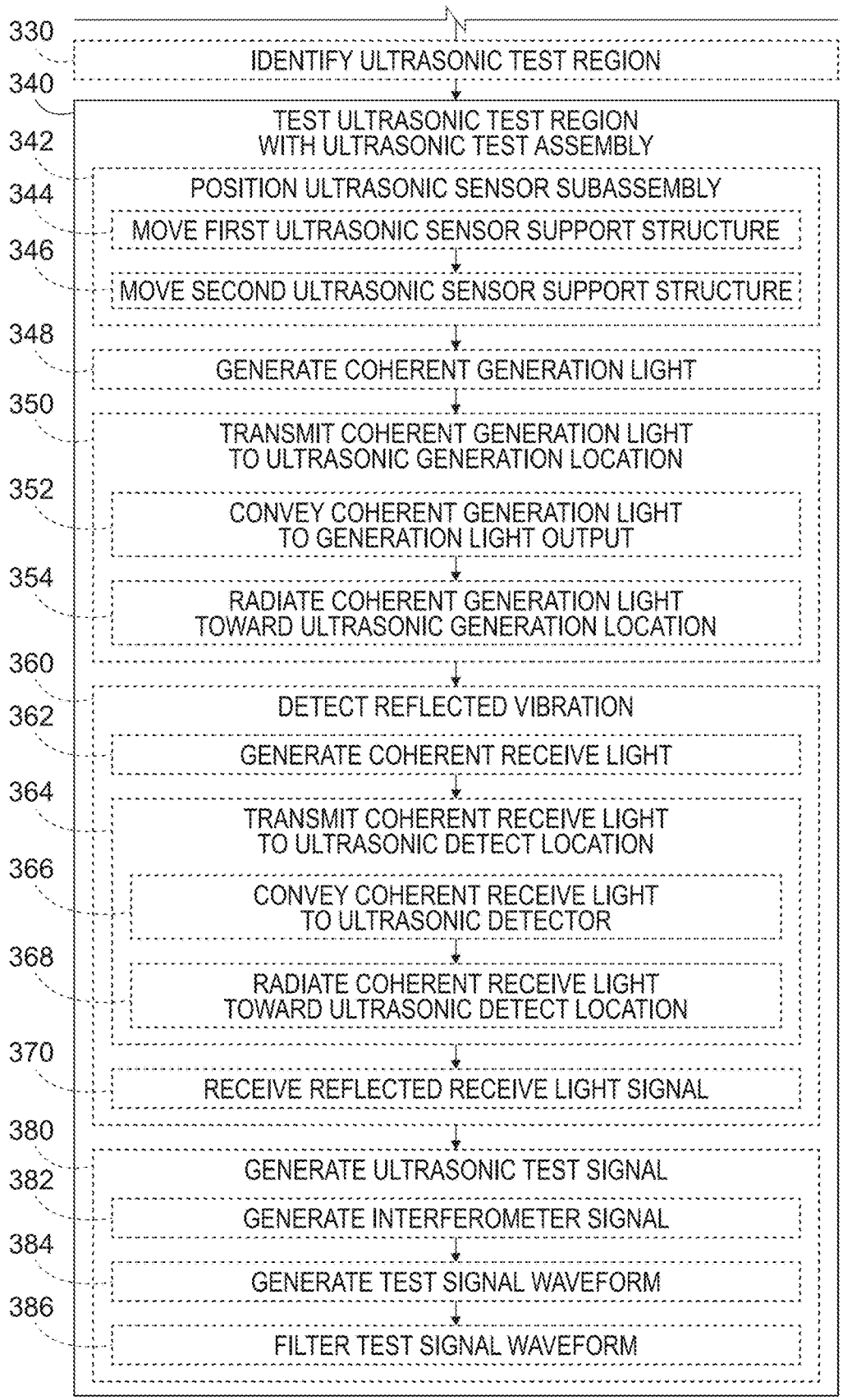
FIG. 5B is a continuation of the flowchart of FIG. 5A.

FIGS. 5A-5B collectively represent a flowchart depicting methods 300, according to the present disclosure, of performing a non-destructive test on a test piece, such as a test piece 10 discussed herein, using a non-destructive test system, such as non-destructive test system 100 discussed herein. As shown in FIGS. 5A-5B, a method 300 includes testing, at 310, an infrared test region of the test piece with an infrared thermography assembly to detect inconsistencies within an infrared test region. Method 300 additionally includes testing, at 340, an ultrasonic test region of the test piece with an ultrasonic test assembly to detect inconsistencies within the ultrasonic test region. Examples of the infrared test region and the ultrasonic test region are disclosed herein with reference to infrared test region 30 and ultrasonic test region 40, respectively. Examples of inconsistencies within the infrared test region and the ultrasonic test region are discussed herein with reference to inconsistencies 20 of test piece 10. Additionally, examples of the infrared thermography assembly and of the ultrasonic test assembly are disclosed herein with reference to infrared thermography assembly 110 and ultrasonic test assembly 210, respectively.

In some examples, and as discussed herein, each the testing the infrared test region at 310 and the testing the ultrasonic test region at 340 includes performing a non-contact test of the test piece. Additionally or alternatively, in some examples, method 300 is performed such that the test piece remains at least substantially stationary and/or fixed relative to at least a portion of the non-destructive test system during each of testing the infrared test region at 310 and the testing the ultrasonic test region at 340. In FIGS. 5A-5B, FIG. 5A generally relates to aspects of the testing the infrared test region at 310, while FIG. 5B generally relates to aspects of the testing the ultrasonic test region at 340.

As discussed herein, the testing the infrared test region at 310 and the testing the ultrasonic test region at 340 each generally include performing non-destructive and/or non-contact tests of the test piece. In this manner, methods 300 disclosed herein generally relate to methods of testing the test piece that serve to reveal the presence and/or absence of inconsistencies within the test piece without irreversibly altering the test piece, such as without physically contacting the test piece. As used herein, references to non-contact testing, testing the test piece without contacting the test piece, and the like generally refer to examples in which the inspection of the test piece does not include and/or necessitate physical contact between the test piece and a portion of the non-destructive test system conducting such tests. However, it also is within the scope of the present disclosure that such methods 300 of testing the test piece may be performed while contacting the test piece with another portion of the non-destructive test system, such as to support the test piece and/or to maintain the test piece in position relative to the non-destructive test system while the test piece is under inspection.

In some examples, and as shown in FIG. 5A, method 300 includes, prior to the testing the infrared test region at 310, identifying, at 302, the infrared test region. Similarly, in some examples, and as shown in FIG. 5B, method 300 includes, prior to the testing the ultrasonic test region at 340, identifying, at 330, the ultrasonic test region. In such examples, the identifying the infrared test region at 302 and/or the identifying the ultrasonic test region at 330 may include partitioning the test piece (and/or a portion thereof) into the infrared test region and/or the ultrasonic test region, such as based upon physical and/or material properties of the test piece.

In some examples, such as in an example in which the infrared thermography assembly is capable of inspecting the test piece more rapidly than the ultrasonic test assembly, the identifying the infrared test region at 302 and/or the identifying the ultrasonic test region at 330 includes identifying such that the infrared test region is larger in area than the ultrasonic test region. In this manner, the identifying the infrared test region at 302 and the identifying the ultrasonic test region at 330 may be at least partially based upon a goal of maximizing a time efficiency of the testing of the test piece. In some other examples, such as in an example in which the ultrasonic test assembly is capable of inspecting the test piece to greater depths within the test piece, the identifying the infrared test region at 302 and/or the identifying the ultrasonic test region at 330 includes identifying such that an average thickness of the test piece within the ultrasonic test region is greater than an average thickness of the test piece within the infrared test region.

Additionally or alternatively, in some examples, the identifying the infrared test region at 302 and/or the identifying the ultrasonic test region at 330 include identifying such that the ultrasonic test region and the infrared test region are at least partially overlapping. In this manner, regions of the test piece that are included in (i.e., identified as being a portion of) each of the infrared test region and the ultrasonic test region are inspected by both the infrared thermography assembly and the ultrasonic test assembly, such as to provide confirmation and/or supplementary information regarding the existence or absence of inconsistencies within such regions.

The testing the infrared test region at 310 and the testing the ultrasonic test region at 340 may be performed in any order. In some examples, the testing the infrared test region is performed at least partially, and/or fully, prior to the testing the ultrasonic test region at 340. In some such examples, the identifying the ultrasonic test region at 330 is at least partially based upon the testing the infrared test region at 310, such as to confirm the existence or absence of inconsistencies within a portion of the infrared test region and/or to inspect such inconsistencies in more detail. In some more specific examples, the identifying the ultrasonic test region at 330 includes defining the ultrasonic test region to include one or more locations within the test piece corresponding to inconsistencies that are identified during the testing the infrared test region at 310. In some other examples, the testing the infrared test region at 310 is performed at least partially, and/or fully, subsequent to the testing the ultrasonic test region at 340. Additionally or alternatively, in some examples, the testing the infrared test region at 310 and the testing the ultrasonic test region at 340 are performed at least partially concurrently, such as to maximize a time efficiency of the testing of the test piece.

The testing the infrared test region at 310 may be performed in any of a variety of manners, such as in the various manners described with reference to infrared thermography assembly 110. In some examples, the infrared thermography assembly includes one or more thermography sensor modules, each of which includes an infrared camera with a respective field of view and at least one thermal source.

Examples of such thermography sensor modules, infrared cameras, and/or thermal sources are disclosed herein with reference to thermography sensor module 140, infrared camera 144, and/or thermal source 146, respectively. In some such examples, and as shown in FIG. 5A, the testing the infrared test region at 310 includes, for each thermography sensor module, positioning, at 312, the thermography sensor module at a thermography inspection area of the test piece and transmitting, at 320, an applied thermal excitation to the thermography inspection area. The transmitting the applied thermal excitation at 320 includes transmitting the thermal excitation with the thermal source(s) of the thermography sensor module. Examples of the thermography inspection area are disclosed herein with reference to thermography inspection area 32, and examples of the applied thermal excitation are disclosed herein with applied thermal excitation 147. In such examples, and as shown in FIG. 5A, the testing the infrared test region at 310 additionally includes, for each thermography sensor module, receiving, at 322, infrared imaging data from the thermography inspection area and generating, at 328, a thermography test signal at least partially based upon the infrared imaging data. Examples of the infrared imaging data and the thermography test signal are disclosed herein with reference to infrared imaging data 112 and thermography test signal 192, respectively.

The positioning the thermography sensor module at 312 may include positioning the thermography sensor module in any of a variety of manners, such as in a manner disclosed herein with reference to thermography sensor module 140. In some examples, the infrared thermography assembly includes one or more thermography support structures, such as thermography support structures 120 described herein, for supporting and/or positioning the thermography sensor module(s) relative to the test piece. Accordingly, in some such examples, the positioning the thermography sensor module at 312 includes positioning with a corresponding thermography support structure that supports the thermography sensor module. In some more specific examples, the thermography support structure includes a moving platform, such as moving platform 124 described herein, and the positioning the thermography sensor module at 312 includes moving the moving platform along a predetermined path (such as predetermined path 126 described herein) relative to the test piece.

In some examples, the positioning the thermography sensor module at 312 is performed at least partially concurrently with the transmitting the applied thermal excitation at 320 and/or the receiving the infrared imaging data at 322. Stated differently, in such examples, the testing the infrared test region at 310 includes positioning (e.g., translating, rotating, and/or otherwise moving) a given (e.g., a particular) thermography sensor module relative to the test piece and testing the test piece with the thermography sensor module at least partially concurrently. In some more specific examples, the positioning the thermography sensor module at 312 includes continuously moving the thermography sensor module concurrently with the transmitting the applied thermal excitation at 320 and/or the receiving the infrared imaging data at 322.

In some examples, and as shown in FIG. 5A, the testing the infrared test region at 310 additionally includes, subsequent to the positioning the thermography sensor module at 140, determining, at 318, a coordinate location to record the location of the thermography inspection area. Specifically, in some such examples, the determining the coordinate location at 318 includes inspecting, viewing, and/or otherwise determining a location of the thermography sensor module relative to the test piece in order to determine, confirm, and/or verify the location of the thermography inspection area. In such examples, the determining the coordinate location at 318 may include representing the location of the thermography inspection area relative to a coordinate system, such as a coordinate system that is defined by the infrared thermography assembly and/or a coordinate system that is defined by the test piece. In some examples, the positioning the thermography sensor module at 312 is at least partially controlled and/or regulated by a thermography test controller of the infrared thermography assembly, such as thermography test controller 190 as described herein.

The transmitting the applied thermal excitation at 320 may include transmitting in any of a variety of manners, such as in a manner disclosed herein with reference to thermal source 146. In some examples, each thermal source includes a flash lamp, and the transmitting the applied thermal excitation at 320 includes activating the flash lamp to illuminate the thermography inspection area, thereby delivering thermal energy to the thermography inspection area and momentarily raising a temperature of the thermography inspection area.

In some examples, and as shown in FIG. 5A, the receiving the infrared imaging data at 322 includes collecting, at 324, the infrared imaging data from the thermography inspection area over a dwell time interval. In such examples, and as shown in FIG. 5A, the testing the infrared test region at 310 includes producing, at 326 and with the thermography test controller, a cooling profile associated with the thermography inspection area that represents the temperature of the thermography inspection area as a function of time during the dwell time interval. Accordingly, in such examples, the generating the thermography test signal at 328 is at least partially based upon the cooling profile. In such examples, the dwell time interval may be any of a variety of suitable time intervals, examples of which include at least 0.5 seconds (s), at least 1 s, at least 3 s, at least 5 s, at least 10 s, at most 12 s, at most 7 s, and/or at most 2 s.

In many examples, the thermography inspection area 32 of a given (e.g., a particular) thermography sensor module is smaller than the full thermography test region to be tested by the infrared thermography assembly. Accordingly, in some such examples, the testing the infrared test region at 310 includes repeating one or more aspects of the testing with a particular thermography sensor module, and/or performing one or more aspects of the testing with each of a plurality of thermography sensor modules. For example, the thermography inspection area may be a first thermography inspection area, such that the testing the infrared test region at 310 additionally includes, subsequent to the receiving the infrared imaging data at 322 from the first thermography inspection area, repositioning the thermography sensor module to a second thermography inspection area of the test piece such that the field of view of the infrared camera encompasses the second thermography inspection area. In some examples, the first thermography inspection area and the second thermography inspection area are at least partially overlapping. In other examples, the first thermography inspection area and the second thermography inspection area are non-overlapping, such as regions that are spaced apart from one another or adjacent to one another.

In some examples, the testing the infrared test region at 310 additionally includes repeating the determining the coordinate location of the thermography inspection area at 318 to record the location of the second thermography inspection area. Additionally or alternatively, in some such examples, the testing the infrared test region at 310 additionally includes repeating the transmitting the applied thermal excitation at 320 to the second thermography inspection area, and/or repeating the receiving the infrared imaging data at 322 from the second thermography inspection area. In this manner, a particular thermography sensor module may operate to inspect a subset and/or an entirety of the infrared test region via repetition of one or more aspects of the testing the infrared test region at 310.

In some examples, the testing the infrared test region at 310 includes testing with a plurality of thermography sensor modules of the infrared thermography assembly. In some such examples, the infrared thermography assembly is configured to selectively move and/or position the plurality of thermography sensor modules independent of one another. In more specific examples, the infrared thermography assembly includes multiple thermography support structures including a first thermography support structure (such as first thermography support structure 121 described herein) that supports a first sensor subset of the plurality of thermography sensor modules (such as first sensor subset 141 described herein). In some such examples, the infrared thermography assembly further includes a second thermography support structure (such as second thermography support structure 122 described herein) that supports a second sensor subset of the plurality of thermography sensor modules (such as second sensor subset 142 described herein). In some such examples, and as shown in FIG. 5A, the positioning the thermography sensor module at 312 thus includes moving, at 314, the first thermography support structure relative to the test piece and/or moving, at 316, the second thermography support structure relative to the test piece. As used herein, terms such as "move," "moving," "motion," and the like are intended to refer to any suitable motion, such as translation, rotation, pivoting, etc.

In some examples, the moving the first thermography support structure at 314 and the moving the second thermography support structure at 316 are performed at least partially concurrently. Additionally or alternatively, in some examples, the moving the first thermography support structure at 314 and the moving the second thermography support structure at 316 are performed independently of one another. In some examples, the testing the infrared test region at 310 includes testing a first side of the test piece (such as first side 16 of test piece 10 as described herein) with the first sensor subset and testing the second side of the test piece (such as second side 18 of test piece 10 as described herein) with the second sensor subset. In this manner, the testing the infrared test region at 310 may include concurrently testing both sides of the test piece, such as to optimize a time efficiency of the testing and/or to test the test piece to a greater depth within the test piece than would be enabled by a single-sided thermographic test.

The generating the thermography test signal at 328 may include generating any of a variety of signals corresponding to the infrared test region. In some examples, the generating the thermography test signal at 328 includes generating an alert indicating the presence of one or more inconsistencies within the infrared test region; an image depicting a portion of the test piece and/or the inconsistency(ies) within the infrared test region; and/or a report identifying the inconsistency/ies within the infrared test region.

Turning now to FIG. 5B, the testing the ultrasonic test region of the test piece at 340 may be performed in any of a variety of suitable manners. In some examples, the ultrasonic test assembly includes one or more ultrasonic sensor subassemblies, each of which may include a respective excitation module and a respective detector module, as well as an ultrasonic test controller that is configured to at least partially control the operation of the ultrasonic test assembly. In some such examples, the ultrasonic test assembly additionally includes an excitation generation light source that is configured to generate an excitation generation light. Examples of the ultrasonic sensor subassembly are disclosed herein with reference to ultrasonic sensor subassembly 240. Similarly, examples of the excitation module, the excitation generation light source, the excitation generation light, the detector module, and the ultrasonic test controller are disclosed herein with reference to excitation module 250, excitation generation light source 242, excitation generation light 244, detector module 260, and/or ultrasonic test controller 290, respectively.

In some such examples, and as shown in FIG. 5B, the testing the ultrasonic test region at 340 includes, for each ultrasonic sensor subassembly 240, positioning, at 342, the ultrasonic sensor subassembly relative to the test piece, generating, at 348, the excitation generation light, and/or transmitting, at 350, the excitation generation light to a respective ultrasonic generation location (such as ultrasonic generation location 50 as described herein). In such examples, the generating the excitation generation light at 348 includes generating with the excitation generation light source, and the transmitting the excitation generation light to the respective ultrasonic generation location at 350 includes transmitting with the respective excitation module, such that the excitation generation light produces a respective ultrasonic beam that propagates with the test piece (such as ultrasonic beam 52 described herein).

In some examples, and as shown in FIG. 5B, the testing the ultrasonic test region at 340 additionally includes detecting, at 360, a respective reflected vibration at a respective ultrasonic detect location on the external surface of the test piece and generating, at 380, an ultrasonic test signal at least partially based on the detecting the respective reflected vibration at 360. In some examples, the detecting the respective reflected vibration at 360 includes detecting surface waves corresponding to the respective reflected vibration, detecting shear waves corresponding to the respective reflected vibration, and/or detecting longitudinal waves corresponding to the respective reflected vibration. In such examples, the detecting the respective reflected vibration is performed with the respective detector module of the ultrasonic sensor subassembly, and the generating the ultrasonic test signal at 380 is performed with the ultrasonic test controller. Examples of the ultrasonic detect location, the respective reflected vibration, and the ultrasonic test signal are disclosed herein with reference to ultrasonic detect location 60, reflected vibration 62, and/or ultrasonic test signal 292, respectively.

The positioning the ultrasonic sensor subassembly at 342 may include positioning the ultrasonic sensor subassembly in any of a variety of manners, such as in a manner disclosed herein with reference to ultrasonic sensor subassembly 240. In some examples, the ultrasonic test assembly includes one or more ultrasonic sensor support structures, such as ultrasonic sensor support structures 220 described herein, for supporting and/or positioning the ultrasonic sensor subassembly(ies) relative to the test piece. Accordingly, in some such examples, and as shown in FIG. 5B, the positioning the ultrasonic sensor subassembly at 342 includes positioning with a corresponding ultrasonic sensor support structure that supports the ultrasonic sensor subassembly. In some more specific examples, the ultrasonic sensor support structure includes a moving platform, such as moving platform 124 described herein, and the positioning the ultrasonic sensor subassembly at 342 includes moving the moving platform along a predetermined path (such as predetermined path 126 described herein) relative to the test piece.

In some examples, the positioning the ultrasonic sensor subassembly at 342 is performed at least partially concurrently with the generating the excitation generation light at 348, the transmitting the excitation generation light at 350, the detecting the respected reflected vibration at 360, and/or the generating the ultrasonic test signal at 380. Stated differently, in such examples, the testing the ultrasonic test region at 340 includes positioning (e.g., translating, rotating, and/or otherwise moving) a given (e.g., a particular) ultrasonic sensor subassembly relative to the test piece and testing the test piece with the ultrasonic sensor subassembly at least partially concurrently. In some more specific examples, the positioning the ultrasonic sensor subassembly at 342 includes continuously moving the ultrasonic sensor subassembly concurrently with the generating the excitation generation light at 348, the transmitting the excitation generation light at 350, and/or the detecting the respected reflected vibration at 360. In some examples, the positioning the ultrasonic sensor subassembly at 342 is at least partially controlled and/or regulated by the ultrasonic test controller.

The generating the excitation generation light at 348 and the transmitting the excitation generation light at 350 may be performed in any of a variety of manners. In some examples, the generating the excitation generation light at 348 includes generating a pulsed laser beam, as described herein.

In some examples, and as shown in FIG. 5B, the transmitting the excitation generation light at 350 includes conveying, at 352, the excitation generation light from the excitation generation light source to the respective excitation module via a generation optical waveguide, such as generation optical waveguide 252 as described herein. Additionally or alternatively, in some examples, and as additionally shown in FIG. 5B, the transmitting the excitation generation light at 350 includes radiating, at 354, the excitation generation light from the respective excitation module toward the respective ultrasonic generation location. In some more specific examples, the radiating the excitation generation light at 354 includes transmitting the excitation generation light to the respective ultrasonic generation location from a terminal end of a generation optical fiber, such as terminal end 256 of generation optical fiber 254 as described herein.

In some examples, the excitation module is one of a plurality of excitation modules, and the transmitting the excitation generation light at 350 includes transmitting the excitation generation light with the plurality of excitation modules to a corresponding plurality of ultrasonic generation locations that collectively define an ultrasonic test pattern as described herein.

The detecting the respective reflected vibration at 360 may be performed in any of a variety of manners. In some examples, the ultrasonic test assembly additionally includes a coherent receive light source, such as coherent receive light source 246 as described herein. In some such examples, and as shown in FIG. 5B, the detecting the respective reflected vibration at 360 includes generating, at 362, a coherent receive light (such as coherent receive light 248 described herein) with the coherent receive light source and transmitting, at 364, the coherent receive light to the respective ultrasonic detect location. In such examples, and as shown in FIG. 5B, the detecting the respective reflected vibration at 360 further includes receiving, at 370, a respective reflected receive light signal that is reflected from the respective ultrasonic detect location. In such examples, the generating the ultrasonic test signal at 380 is performed at least partially based upon the receiving the respective reflected light signal at 370. Stated differently, in such examples, the generating the ultrasonic test signal at 380 includes generating such that the ultrasonic test signal is at least partially based upon the respective reflected light signal. Examples of the respective reflected receive light signal are described herein with reference to reflected receive light signal 266.

The transmitting the coherent receive light to the respective ultrasonic detect location at 364 may be performed in any of a plurality of suitable manners, such as in a manner described herein with reference to coherent receive light 248. In some examples, and as shown in FIG. 5B, the transmitting the coherent receive light to the respective ultrasonic detect location at 364 includes conveying, at 366, the coherent receive light from the coherent receive light source to a respective ultrasonic detector of at least one ultrasonic sensor subassembly. More specifically, in such examples, the conveying the coherent receive light at 366 includes conveying with a receive optical waveguide, such as receive optical waveguide 268 described herein. Examples of such ultrasonic detectors are described herein with reference to ultrasonic detector 262.

Additionally or alternatively, in some examples, and as shown in FIG. 5B, the transmitting the coherent receive light to the respective ultrasonic detect location at 364 includes radiating, at 368, the coherent receive light from the respective ultrasonic detector toward the respective ultrasonic detect location. In some more specific examples, the radiating the coherent receive light at 368 includes transmitting the coherent receive light from a terminal end of a receive optical fiber, such as terminal end 256 of receive optical fiber 270 as described herein. Similarly, in some examples, the receiving the respective reflected light signal at 370 also includes receiving via a terminal end of an optical fiber. Specifically, in some such examples, the receiving the respective reflected light signal at 370 includes receiving with the respective ultrasonic detector, such as with the receive optical waveguide and/or with the terminal end of the receive optical fiber.

In some examples, such as an example in which the ultrasonic sensor subassembly includes a plurality of excitation modules, the respective ultrasonic detector also may be one of a plurality of ultrasonic detectors. In some such examples, the transmitting to coherent receive light at 364 includes transmitting the coherent receive light with the plurality of ultrasonic detectors to a portion of the test piece corresponding to the ultrasonic test pattern to which the plurality of excitation modules transmits the excitation generation light.

The generating the ultrasonic test signal at 380 may include analyzing and/or processing the respective reflected light signal in any of a plurality of manners, such as with an interferometer system such as interferometer system 280 described herein. In some such examples, and as shown in FIG. 5B, the detecting the respective reflected vibration at 360 includes generating, at 382, an interferometer signal (such as interferometer signal 282) with the interferometer system. Specifically, in such examples, the generating the interferometer signal at 382 is at least partially based upon the receiving the respective reflected receive light signal at 370, and the generating the ultrasonic test signal at 380 thus is at least partially based on the generating the interferometer signal at 382.

In some examples, the generating the ultrasonic test signal at 380 includes performing a signal analysis corresponding to the respective reflected vibration, such as may be represented by the respective reflected receive light signal. In some such examples, and as shown in FIG. 5B, the generating the ultrasonic test signal at 380 includes generating, at 384, a test signal waveform and filtering, at 386, the test signal waveform to isolate a signal corresponding to the respective reflected vibration.

In some examples, the generating the test signal waveform at 384 includes generating at least partially based upon the respective reflected receive light signal. For example, the generating the test signal waveform at 384 may include generating such that the test signal waveform is a time series representation of a magnitude of the respective reflected receive light signal, a phase of the respective reflected receive light signal, etc. In such examples, the test signal waveform may include noise components that do not correspond to the signal of interest. Accordingly, in some examples, the filtering the test signal waveform at 386 includes filtering based upon known parameters of the respective ultrasonic beam that created the respective reflected vibration. In some more specific examples, the filtering the test signal waveform at 386 includes filtering with one or more bandpass filters, such as bandpass filters that are configured to isolate a signal corresponding to a characteristic frequency of the respective ultrasonic beam and/or any other suitable spectral characteristics of the test signal waveform.

The generating the ultrasonic test signal at 380 may include generating any of a variety of signals corresponding to the ultrasonic test region. In some examples, the generating the ultrasonic test signal at 380 includes generating an alert indicating the presence of one or more inconsistencies within the ultrasonic test region; an image depicting a portion of the test piece and/or the inconsistency(ies) within the ultrasonic test region; and/or a report identifying the inconsistency(ies) within the ultrasonic test region.

In some examples, the testing the ultrasonic test region at 340 includes testing with a plurality of ultrasonic sensor subassemblies of the ultrasonic test assembly. In some such examples, the ultrasonic test assembly is configured to selectively move and/or position the plurality of ultrasonic sensor subassemblies independent of one another. In more specific examples, the ultrasonic test assembly includes multiple ultrasonic sensor support structures including a first ultrasonic sensor support structure (such as first ultrasonic sensor support structure 221 described herein) that supports a first ultrasonic sensor subset of the plurality of ultrasonic sensor subassemblies. In such examples, the ultrasonic test assembly further includes a second ultrasonic sensor support structure (such as second ultrasonic sensor support structure 222 described herein) that supports a second ultrasonic sensor subset of the plurality of ultrasonic sensor subassemblies. In some such examples, and as shown in FIG. 5B, the positioning the ultrasonic sensor subassembly at 342 thus includes moving, at 344, the first ultrasonic sensor support structure relative to the test piece and/or moving, at 346, the second ultrasonic sensor support structure relative to the test piece.

In some examples, the moving the first ultrasonic sensor support structure at 344 and the moving the second ultrasonic sensor support structure at 346 are performed at least partially concurrently. Additionally or alternatively, in some examples, the moving the first ultrasonic sensor support structure at 344 and the moving the second ultrasonic sensor support structure at 346 are performed independently of one another. In some examples, the testing the ultrasonic test region at 340 includes testing a first side of the test piece (such as first side 16 of test piece 10 as described herein) with the first ultrasonic sensor subset and testing the second side of the test piece (such as second side 18 of test piece 10 as described herein) with the second ultrasonic sensor subset. In this manner, the testing the ultrasonic test region at 340 may include concurrently testing both sides of the test piece, such as to optimize a time efficiency of the testing and/or to test the test piece to a greater depth within the test piece than would be enabled by a single-sided ultrasonic test.

While the present disclosure generally relates to examples of methods 300 in which the testing the ultrasonic test region at 340 is performed via non-contact testing and/or utilizing an excitation light, such as coherent light, this is not required of all examples of non-destructive test system 100. For example, it also is within the scope of the present disclosure that the testing the ultrasonic test region at 340 may utilize and/or employ any of a variety of ultrasonic testing routines and/or methodologies, examples of which include air-coupled ultrasonic testing, water-coupled ultrasonic testing, etc., such as may be selected according to the constraints and requirements of a particular test case.

Illustrative, non-exclusive examples of inventive subject matter according to the present disclosure are described in the following enumerated paragraphs:

A1. A non-destructive test system (100) for performing a non-destructive test on a test piece (10) to detect a presence of inconsistencies (20) within the test piece (10), the non-destructive test system (100) comprising:

an infrared thermography assembly (110) configured to test an infrared test region (30) of the test piece (10) to detect inconsistencies (20) within the infrared test region (30); and an ultrasonic test assembly (210) configured to test an ultrasonic test region (40) of the test piece (10) to detect inconsistencies (20) within the ultrasonic test region (40).

A2. The non-destructive test system (100) of paragraph A1, in combination with the test piece (10).

A3. The non-destructive test system (100) of any of paragraphs A1-A2, wherein the test piece (10) includes one or more laminate plies of composite material, optionally a carbon epoxy laminate material.

A4. The non-destructive test system (100) of any of paragraphs A1-A3, wherein the test piece (10) includes a portion of an airframe of an aircraft, optionally a portion of a fuselage of an aircraft.

A5. The non-destructive test system (100) of any of paragraphs A1-A4, wherein the test piece (10) is curved about a test piece axis (12), optionally wherein the test piece (10) is at least substantially axially symmetric about the test piece axis (12), optionally wherein the test piece (10) is at least substantially cylindrical.

A6. The non-destructive test system (100) of any of paragraphs A1-A5, wherein an average thickness of the test piece (10) within the ultrasonic test region (40) is greater than an average thickness of the test piece (10) within the infrared test region (30).

A7. The non-destructive test system (100) of any of paragraphs A1-A6, wherein the infrared test region (30) is larger in area than the ultrasonic test region (40).

A8. The non-destructive test system (100) of any of paragraphs A1-A7, wherein the ultrasonic test region (40) and the infrared test region (30) are at least partially overlapping.

A9. The non-destructive test system (100) of any of paragraphs A1-A8, wherein one or both of the infrared thermography assembly (110) and the ultrasonic test assembly (210) is configured to detect inconsistencies (20) that include, and optionally are, one or more of a wrinkle, an impurity, a void, an inclusion, a porosity, a crack, a joint inconsistency, a bond discontinuity, a delamination, and corrosion.

A10. The non-destructive test system (100) of any of paragraphs A1-A9, wherein the infrared thermography assembly (110) includes:

one or more thermography sensor modules (140), each thermography sensor module (140) configured to receive infrared imaging data (112) from the test piece (10); and a thermography test controller (190) configured to at least partially control operation of the infrared thermography assembly (110);

wherein the thermography test controller (190) is configured to generate a thermography test signal (192) based, at least in part, on the infrared imaging data (112).

A11. The non-destructive test system (100) of paragraph A10, wherein the infrared thermography assembly (110) further includes one or more thermography support structures (120); wherein each thermography support structure (120) of the one or more thermography support structures (120):

(i) operatively supports a corresponding subset of the one or more thermography sensor modules (140); and (ii) is configured to selectively and operatively position the corresponding subset of the one or more thermography sensor modules (140) relative to the test piece (10).

A12. The non-destructive test system (100) of any of paragraphs A10-A11, wherein the infrared thermography assembly (110) is configured to test the infrared test region (30) without physically contacting the test piece (10) with the one or more thermography sensor modules (140).

A13. The non-destructive test system (100) of any of paragraphs A10-A12, wherein each thermography sensor module (140) includes an infrared camera (144) that is configured to receive the infrared imaging data (112) from the test piece (10).

A14. The non-destructive test system (100) of paragraph A13, wherein the infrared camera (144) includes a focal plane array device that is configured to perform as a spectral radiometer.

A15. The non-destructive test system (100) of any of paragraphs A13-A14, wherein each thermography sensor module (140) further includes at least one thermal source (146) that is configured to transmit an applied thermal excitation (147) to a thermography inspection area (32) of the test piece (10); and wherein the infrared camera (144) is configured to collect the infrared imaging data (112) from the thermography inspection area (32) over a dwell time interval to produce a cooling profile associated with the thermography inspection area (32).

A16. The non-destructive test system (100) of paragraph A15, wherein each thermography sensor module (140) further includes a hood (148) that at least substantially encloses the infrared camera (144) and the at least one thermal source (146).

A17. The non-destructive test system (100) of any of paragraphs A15-A16, wherein the thermography inspection area (32) corresponds to, and optionally is, a field of view of the infrared camera (144).

A18. The non-destructive test system (100) of any of paragraphs A15-A17, wherein the cooling profile at least partially represents a temperature of the thermography inspection area (32) as a function of time during the dwell time interval.

A19. The non-destructive test system (100) of any of paragraphs A15-A18, wherein the thermography test signal (192) is based, at least in part, on the cooling profile.

A20. The non-destructive test system (100) of any of paragraphs A15-A19, wherein each thermal source (146) of the at least one thermal source (146) includes, and optionally is, a light source, optionally a flash lamp.

A21. The non-destructive test system (100) of any of paragraphs A11-A20, wherein the one or more thermography sensor modules (140) includes a plurality of thermography sensor modules (140); and wherein at least one of the one or more thermography support structures (120) supports the corresponding subset of the plurality of thermography sensor modules (140) such that the corresponding subset of thermography sensor modules (140) forms an array that at least substantially spans the test piece (10).

A22. The non-destructive test system (100) of any of paragraphs A11-A21, wherein at least one of the one or more thermography support structures (120) includes, and optionally is, a moving platform (124) that is configured to move along a predetermined path (126) relative to the test piece (10).

A23. The non-destructive test system (100) of paragraph A22, wherein the moving platform (124) includes, and optionally is, a gantry that spans the test piece (10).

A24. The non-destructive test system (100) of any of paragraphs A11-A23, wherein at least one of the one or more thermography support structures (120) includes a thermography end effector (132) that supports the corresponding subset of the one or more thermography sensor modules (140) and a thermography robotic arm (130) that is configured to move the thermography end effector (132) relative to the test piece (10).

A25. The non-destructive test system (100) of paragraph A24, wherein the thermography end effector (132) is configured to be selectively and repeatedly coupled to and removed from the thermography robotic arm (130).

A26. The non-destructive test system (100) of any of paragraphs A11-A25, wherein the one or more thermography sensor modules (140) includes a plurality of thermography sensor modules (140); wherein the one or more thermography support structures (120) includes:

a first thermography support structure (121) that supports a first sensor subset (141) of the plurality of thermography sensor modules (140); and a second thermography support structure (122) that supports a second sensor subset (142) of the plurality of thermography sensor modules (140).

A27. The non-destructive test system (100) of paragraph A26, wherein the first sensor subset (141) is configured to test a first side (16) of the test piece (10); and wherein the second sensor subset (142) is configured to test a second side (18) of the test piece (10) that is opposite the first side (16).

A28. The non-destructive test system (100) of any of paragraphs A10-A27, wherein the thermography test signal (192) includes one or more of:

(i) an alert indicating the presence of one or more inconsistencies (20) within the thermography inspection area (32);

(ii) an image depicting one or both of at least a portion of the test piece (10) and the one or more inconsistencies (20) within the thermography inspection area (32); and (iii) a report identifying the one or more inconsistencies (20) within the thermography inspection area (32).

A29. The non-destructive test system (100) of any of paragraphs A10-A28, further comprising a user interface (90); wherein the thermography test controller (190) is configured to transmit the thermography test signal (192) to the user interface (90).

A30. The non-destructive test system (100) of paragraph A29, wherein the user interface (90) includes one or more of a visual display, a speaker, and a printer.

A31. The non-destructive test system (100) of any of paragraphs A1-A30, wherein the ultrasonic test assembly (210) includes:

one or more ultrasonic sensor subassemblies (240), each ultrasonic sensor subassembly (240) including a respective excitation module (250) and a respective detector module (260); and an ultrasonic test controller (290) configured to at least partially control operation of the ultrasonic test assembly (210);

wherein the respective excitation module (250) of each ultrasonic sensor subassembly (240) of the one or more ultrasonic sensor subassemblies (240) is configured to produce a respective ultrasonic beam (52) that propagates within the test piece (10); wherein the respective detector module (260) of each ultrasonic sensor subassembly (240) of the one or more ultrasonic sensor subassemblies (240) is configured to detect a respective reflected vibration (62) at a respective ultrasonic detect location (60) on the external surface (14) of the test piece (10); wherein the respective reflected vibration (62) is generated within the test piece (10) responsive to the respective ultrasonic beam (52); and wherein the ultrasonic test controller (290) is configured to generate an ultrasonic test signal (292) based, at least in part, on each respective reflected vibration (62).

A32. The non-destructive test system (100) of paragraph A31, wherein the ultrasonic test assembly (210) further includes an excitation generation light source (242) configured to generate an excitation generation light (244), optionally one or both of coherent light and laser light; and wherein the respective excitation module (250) of each ultrasonic sensor subassembly (240) of the one or more ultrasonic sensor subassemblies (240) is configured to transmit the excitation generation light (244) to a respective ultrasonic generation location (50) on an external surface (14) of the test piece to produce the respective ultrasonic beam (52)

A33. The non-destructive test system (100) of paragraph A32, wherein the excitation generation light (244) is at least substantially monochromatic.

A34. The non-destructive test system (100) of any of paragraphs A32-A33, wherein the excitation generation light source (242) includes one or more of a superluminescent diode, a laser, a gas laser, a carbon dioxide gas laser, a solid state laser, a diode laser, and an Nd:YAG laser.

A35. The non-destructive test system (100) of any of paragraphs A32-A34, wherein the excitation generation light source (242) is configured to generate the excitation generation light (244) in the form of a pulsed laser beam.

A36. The non-destructive test system (100) of paragraph A35, wherein the excitation generation light source (242) is configured to generate the pulsed laser beam with a pulse repetition rate that is one or more of at least 5 kilohertz (kHz), at least 10 kHz, at least 50 kHz, at least 100 kHz, at least 500 kHz, at most 700 kHz, at most 200 kHz, at most 70 kHz, at most 20 kHz, and at most 7 kHz.

A37. The non-destructive test system (100) of any of paragraphs A35-A36, wherein the pulsed laser beam includes a plurality of laser pulses, and wherein each laser pulse has an energy that is one or more of at least 0.1 microjoules (µJ), at least 1 µJ, at least 10 µJ, at least 100 µJ, at least 1,000 µJ, at least 10,000 µJ, at most 50,000 µJ, at most 5,000 µJ, at most 500 µJ, at most 50 µJ, at most 5 µJ, and at most 0.5 µJ.

A38. The non-destructive test system (100) of any of paragraphs A32-A37, wherein each respective ultrasonic generation location (50) has a diameter that is one or more of at least 0.01 millimeters (mm), at least 0.05 mm, at least 0.1 mm, at least 0.5 mm, at least 1 mm, at most 5 mm, at most 0.7 mm, at most 0.2 mm, at most 0.07 mm, and at most 0.02 mm.

A39. The non-destructive test system (100) of any of paragraphs A32-A38, wherein the ultrasonic test assembly (210) further includes one or more generation optical waveguides (252) configured to convey the excitation generation light (244) from the excitation generation light source (242) to the respective excitation module (250) of at least one ultrasonic sensor subassembly (240) of the one or more ultrasonic sensor subassemblies (240).

A40. The non-destructive test system (100) of paragraph A39, wherein each ultrasonic sensor subassembly (240) of the one or more ultrasonic sensor subassemblies (240) includes a respective generation optical waveguide (252) of the one or more generation optical waveguides (252).

A41. The non-destructive test system (100) of any of paragraphs A32-A40, wherein one or both of a/the one or more generation optical waveguides (252) and the respective excitation module (250) of at least one ultrasonic sensor subassembly (240) of the one or more ultrasonic sensor subassemblies (240) includes a generation optical fiber (254).

A42. The non-destructive test system (100) of paragraph A41, wherein the respective excitation module (250) includes a terminal end (256) of the generation optical fiber (254).

A43. The non-destructive test system (100) of any of paragraphs A31-A42, wherein each respective ultrasonic beam (52) includes, and optionally is, an acoustic wave.

A44. The non-destructive test system (100) of any of paragraphs A31-A43, wherein each respective ultrasonic beam (52) includes, and optionally is, a wide-band ultrasonic signal such that a range of frequencies in the respective ultrasonic beam (52) is at least 50% of a characteristic frequency of the respective ultrasonic beam (52).

A45. The non-destructive test system (100) of any of paragraphs A31-A44, wherein a/the characteristic frequency of each respective ultrasonic beam (52) is one or more of at least 100 kHz, at least 300 kHz, at least 500 kHz, at least 1 Megahertz (MHz), at least 3 MHz, at least 5 MHz, at least 10 MHz, at least 30 MHz, at most 50 MHz, at most 20 MHz, at most 7 MHz, at most 2 MHz, and at most 700 kHz.

A46. The non-destructive test system (100) of any of paragraphs A31-A45, wherein the ultrasonic test assembly (210) further includes a coherent receive light source (246) configured to generate a coherent receive light (248), optionally laser light; wherein the respective detector module (260) of at least one ultrasonic sensor subassembly (240) of the one or more ultrasonic sensor subassemblies (240) includes a respective ultrasonic detector (262) configured to:

(i) transmit the coherent receive light (248) to the respective ultrasonic detect location (60); and (ii) receive a respective reflected receive light signal (266) that includes a portion of the coherent receive light (248) that is reflected by the test piece (10); and wherein the ultrasonic test signal (292) is based, at least in part, on the respective reflected receive light signal (266).

A47. The non-destructive test system (100) of paragraph A46, wherein the coherent receive light (248) is at least substantially monochromatic.

A48. The non-destructive test system (100) of any of paragraphs A46-A47, wherein the coherent receive light source (246) includes one or more of a superluminescent diode, a laser, a gas laser, a carbon dioxide gas laser, a solid state laser, a diode laser, and an Nd:YAG laser.

A49. The non-destructive test system (100) of any of paragraphs A46-A48, wherein the ultrasonic test assembly (210) further includes one or more receive optical waveguides (268) configured to convey the coherent receive light (248) from the coherent receive light source (246) toward the respective ultrasonic detect location (60) of at least one ultrasonic sensor subassembly (240) of the one or more ultrasonic sensor subassemblies (240).

A50. The non-destructive test system (100) of any of paragraphs A46-A49, wherein one or both of a/the one or more receive optical waveguides (268) and the respective ultrasonic detector (262) of at least one ultrasonic sensor subassembly (240) of the one or more ultrasonic sensor subassemblies (240) includes a receive optical fiber (270).

A51. The non-destructive test system (100) of paragraph A50, wherein the respective ultrasonic detector (262) includes a terminal end (256) of the receive optical fiber (270).

A52. The non-destructive test system (100) of any of paragraphs A46-A51, when dependent from paragraph A32, wherein the coherent receive light (248) has a different wavelength than the excitation generation light (244).

A53. The non-destructive test system (100) of any of paragraphs A32-A52, wherein the respective ultrasonic generation location (50) and the respective ultrasonic detect location (60) of at least one ultrasonic sensor subassembly (240) of the one or more ultrasonic sensor subassemblies (240) are at least partially overlapping.

A54. The non-destructive test system (100) of any of paragraphs A32-A52, wherein the respective ultrasonic detect location (60) is spaced apart from the respective ultrasonic generation location (50) of at least one ultrasonic sensor subassembly (240) of the one or more ultrasonic sensor subassemblies (240) by an ultrasonic test offset distance, as measured along the external surface (14) of the test piece (10).

A55. The non-destructive test system (100) of any of paragraphs A46-A54, wherein the ultrasonic test assembly (210) further includes an interferometer system (280) that is configured to generate an interferometer signal (282) based, at least in part, on the coherent receive light (248) and the respective reflected receive light signal (266) corresponding to at least one respective ultrasonic detector (262) of the one or more ultrasonic sensor subassemblies (240); and wherein the ultrasonic test controller (290) is configured to generate the ultrasonic test signal (292) based, at least in part, on the interferometer signal (282).

A56. The non-destructive test system (100) of paragraph A55, wherein the interferometer system (280) is configured to detect one or more of a displacement, a deflection, a surface velocity, and a vibration of the test piece (10) at the respective ultrasonic detect location (60) of at least one ultrasonic sensor subassembly (240) of the one or more ultrasonic sensor subassemblies (240) corresponding to each respective reflected vibration (62).

A57. The non-destructive test system (100) of any of paragraphs A55-A56, wherein the interferometer system (280) includes a fiber-optic modified Sagnac interferometer.

A58. The non-destructive test system (100) of any of paragraphs A32-A57, wherein the respective excitation module (250) of at least one ultrasonic sensor subassembly (240) of the one or more ultrasonic sensor subassemblies (240) is one of a plurality of excitation modules (250); and wherein each respective ultrasonic generation location (50) is one of a plurality of ultrasonic generation locations (50) that collectively define an ultrasonic test pattern (42).

A59. The non-destructive test system (100) of paragraph A58, wherein the ultrasonic test pattern (42) has the shape of one or more of a line, a polygon, a rectangle, an ellipse, and a circle.

A60. The non-destructive test system (100) of any of paragraphs A32-A59, wherein each excitation module (250) of the plurality of excitation modules (250) is configured to transmit a respective excitation generation light (244); and wherein the respective excitation generation lights (244) of two or more of the plurality of excitation modules (250) have different wavelengths.

A61. The non-destructive test system (100) of any of paragraphs A31-A60, wherein the ultrasonic test assembly (210) further includes one or more ultrasonic sensor support structures (220); wherein each ultrasonic sensor support structure (220) of the one or more ultrasonic sensor support structures (220):

(i) operatively supports a corresponding subset of the one or more ultrasonic sensor subassemblies (240); and (ii) is configured to selectively and operatively position the corresponding subset of the one or more ultrasonic sensor subassemblies (240) relative to the test piece (10).

A62. The non-destructive test system (100) of any of paragraphs A31-A61, wherein the ultrasonic test assembly (210) is configured to test the ultrasonic test region (40) without physically contacting the test piece (10) with any of the one or more ultrasonic sensor subassemblies (240).

A63. The non-destructive test system (100) of any of paragraphs A31-A62, wherein at least a portion of the ultrasonic test controller (290) includes at least a portion of, and optionally is, a/the thermography test controller (190).

A64. The non-destructive test system (100) of any of paragraphs A61-A63, wherein at least one ultrasonic sensor support structure (220) of the one or more ultrasonic sensor support structures (220) includes an ultrasonic sensor end effector (232) that supports the corresponding subset of the one or more ultrasonic sensor subassemblies (240) and an ultrasonic sensor robotic arm (230) that is configured to move the ultrasonic sensor end effector (232) relative to the test piece (10).

A65. The non-destructive test system (100) of paragraph A64, wherein the ultrasonic sensor end effector (232) is configured to be selectively and repeatedly coupled to and removed from the ultrasonic sensor robotic arm (230).

A66. The non-destructive test system (100) of any of paragraphs A61-A65, when dependent from paragraph A11, wherein one or both of:

(i) at least one thermography support structure (120) of the one or more thermography support structures (120) includes at least a portion of the one or more ultrasonic sensor support structures (220); and (ii) at least one ultrasonic sensor support structure (220) of the one or more ultrasonic sensor support structures (220) includes at least a portion of the one or more thermography support structures (120).

A67. The non-destructive test system (100) of any of paragraphs A64-A66, when dependent from paragraph A11, wherein the ultrasonic sensor robotic arm (230) includes at least a portion of, and optionally is, a/the thermography robotic arm (130) of one of the one or more thermography support structures (120).

A68. The non-destructive test system (100) of any of paragraphs A46-A67, wherein the respective ultrasonic detector (262) of each ultrasonic sensor subassembly (240) of the one or more ultrasonic sensor subassemblies (240) is one of a plurality of ultrasonic detectors (262); and wherein the plurality of ultrasonic detectors (262) are configured to transmit the coherent receive light (248) to a portion of the test piece (10) corresponding to a/the ultrasonic test pattern (42).

A69. The non-destructive test system (100) of any of paragraphs A31-68, wherein the one or more ultrasonic sensor subassemblies (240) includes a plurality of ultrasonic sensor subassemblies (240) that are configured to test the test piece (10) concurrently.

A70. The non-destructive test system (100) of paragraph A69, when dependent from paragraph A61, wherein the one or more ultrasonic sensor support structures (220) includes a plurality of ultrasonic sensor support structures (220); wherein each ultrasonic sensor support structure (220) of the plurality of ultrasonic sensor support structures (220) operatively supports at least one corresponding ultrasonic sensor subassembly (240) of the plurality of ultrasonic sensor subassemblies (240); and wherein the plurality of ultrasonic sensor support structures (220) are configured to selectively reposition the plurality of ultrasonic sensor subassemblies (240) at least partially independent of one another.

A71. The non-destructive test system (100) of any of paragraphs A31-A70, wherein the ultrasonic test signal (292) includes one or more of:

(i) an alert indicating the presence of one or more inconsistencies (20) within the ultrasonic test region (40);

(ii) an image depicting one or both of at least a portion of the test piece (10) and the one or more inconsistencies (20) within the ultrasonic test region (40); and (iii) a report identifying the one or more inconsistencies (20) within the ultrasonic test region (40).

A72. The non-destructive test system (100) of any of paragraphs A31-A71, wherein the ultrasonic test controller (290) is configured to transmit the ultrasonic test signal (292) to a/the user interface (90).

B1. A method (300) of performing a non-destructive test on a test piece (10) using the non-destructive test system (100) of any of paragraphs A1-A72, the method comprising:

testing (310) the infrared test region (30) with the infrared thermography assembly (110) to detect inconsistencies (20) within the infrared test region (30); and testing (340) the ultrasonic test region (40) of the test piece (10) with the ultrasonic test assembly (210) to detect inconsistencies (20) within the ultrasonic test region (40).

B2. The method (300) of paragraph B1, wherein each of the testing (310) the infrared test region (30) and the testing (340) the ultrasonic test region (40) includes performing a non-contact test.

B3. The method (300) of any of paragraphs B1-B2, wherein the test piece (10) remains at least substantially stationary relative to at least a portion of the non-destructive test system (100) during each of the testing (310) the infrared test region (30) and the testing (340) the ultrasonic test region (40).

B4. The method (300) of any of paragraphs B1-B3, further comprising, prior to the testing (310) the infrared test region (30), identifying (302) the infrared test region (30).

B5. The method (300) of any of paragraphs B1-B4, further comprising, prior to the testing (340) the ultrasonic test region (40), identifying (330) the ultrasonic test region (40).

B6. The method (300) of any of paragraphs B1-B5, wherein one or both of a/the identifying (302) the infrared test region (30) and a/the identifying (330) the ultrasonic test region (40) includes identifying such that an average thickness of the test piece (10) within the ultrasonic test region (40) is greater than an average thickness of the test piece (10) within the infrared test region (30).

B7. The method (300) of any of paragraphs B1-B6, wherein one or both of a/the identifying (302) the infrared test region (30) and a/the identifying (330) the ultrasonic test region (40) includes identifying such that the infrared test region (30) is larger in area than the ultrasonic test region (40).

B8. The method (300) of any of paragraphs B1-B7, wherein one or both of a/the identifying (302) the infrared test region (30) and a/the identifying (330) the ultrasonic test region (40) includes identifying such that the ultrasonic test region (40) and the infrared test region (30) are at least partially overlapping.

B9. The method (300) of any of paragraphs 131-138, wherein the testing (310) the infrared test region (30) is performed at least partially, and optionally fully, prior to the testing (340) the ultrasonic test region (40).

B10. The method (300) of any of paragraphs B5-B9, wherein the identifying (330) the ultrasonic test region (40) is based, at least in part, on the testing (310) the infrared test region (30).

B11. The method (300) of any of paragraphs 135-1310, wherein the identifying (330) the ultrasonic test region (40) includes defining the ultrasonic test region (40) to include one or more locations corresponding to inconsistencies (20) identified during the testing (310) the infrared test region (30).

B12. The method (300) of any of paragraphs B1-B11, wherein the testing (310) the infrared test region (30) is performed at least partially, and optionally fully, subsequent to the testing (340) the ultrasonic test region (40).

B13. The method (300) of any of paragraphs B1-B12, wherein the testing (310) the infrared test region (30) and the testing (340) the ultrasonic test region (40) are performed at least partially concurrently.

B14. The method (300) of any of paragraphs B1-B13, wherein the infrared thermography assembly (110) includes a/the one or more thermography sensor modules (140); wherein each thermography sensor module (140) includes an/the infrared camera (144) with a/the field of view and a/the at least one thermal source (146); and wherein the testing (310) the infrared test region (30) includes, for each thermography sensor module (140) of the one or more thermography sensor modules (140):

positioning (312) the thermography sensor module (140) at a/the thermography inspection area (32) of the test piece (10) such that the field of view encompasses the thermography inspection area (32);

transmitting (320), with the at least one thermal source (146), an/the applied thermal excitation (147) to the thermography inspection area (32);

receiving (322), with the infrared camera (144), an/the infrared imaging data (112) from the thermography inspection area (32); and generating (328), with a/the thermography test controller (190), a/the thermography test signal (192) based, at least in part, on the infrared imaging data (112).

B15. The method (300) of paragraph B14, wherein the testing (310) the infrared test region (30) further includes, subsequent to the positioning (312) the thermography sensor module (140), determining (318) a coordinate location to record the location of the thermography inspection area (32).

B16. The method (300) of any of paragraphs B14-B15, wherein the thermography inspection area (32) is a first thermography inspection area (32); and wherein the testing (310) the infrared test region (30) further includes, subsequent to the receiving (322) the infrared imaging data (112) from the first thermography inspection area (32):

repeating the positioning (312) the thermography sensor module (140) to position the thermography sensor module (140) at a second thermography inspection area (32) of the test piece (10) such that the field of view encompasses the second thermography inspection area (32);

optionally, repeating a/the determining (318) the coordinate location to record the location of the second thermography inspection area (32);

repeating the transmitting (320) the applied thermal excitation (147) to the second thermography inspection area (32); and repeating the receiving (322) the infrared imaging data (112) from the second thermography inspection area (32).

B17. The method (300) of paragraph B16, wherein the first thermography inspection area (32) and the second thermography inspection area (32) are non-overlapping.

B18. The method (300) of paragraph B16, wherein the first thermography inspection area (32) and the second thermography inspection area (32) are at least partially overlapping.

B19. The method (300) of any of paragraphs B14-B18, wherein the infrared thermography assembly (110) further includes a/the one or more thermography support structures (120); and wherein the positioning (312) the thermography sensor module (140) includes positioning with a corresponding thermography support structure (120) of the one or more thermography support structures (120) that supports the thermography sensor module (140).

B20. The method (300) of any of paragraphs B14-B19, wherein the positioning (312) the thermography sensor module (140) is controlled, at least in part, by the thermography test controller (190).

B21. The method (300) of any of paragraphs B14-B20, wherein the thermography support structure (120) includes a/the moving platform (124); and wherein the positioning (312) the thermography sensor module (140) includes moving the moving platform (124) along a/the predetermined path (126) relative to the test piece (10).

B22. The method (300) of any of paragraphs B14-B21, wherein the positioning (312) the thermography sensor module (140) is performed at least partially concurrently with one or both of the transmitting (320) the applied thermal excitation (147) and the receiving (322) the infrared imaging data (112).

B23. The method (300) of paragraph B22, wherein one or both of the positioning (312) the thermography sensor module (140) and a/the repeating the positioning (312) the thermography sensor module (140) includes continuously moving the thermography sensor module (140) concurrently with one or both of the transmitting (320) the applied thermal excitation (147) and the receiving (322) the infrared imaging data (112).

B24. The method (300) of any of paragraphs B14-B23, wherein each thermal source (146) of the at least one thermal source (146) includes a/the flash lamp, and wherein the transmitting (320) the applied thermal excitation (147) includes activating the flash lamp to illuminate the thermography inspection area (32).

B25. The method (300) of any of paragraphs B14-B24, wherein the receiving (322) the infrared imaging data (112) includes collecting (324) the infrared imaging data (112) from the thermography inspection area (32) over a/the dwell time interval; and wherein the testing (310) the infrared test region (30) further includes, with a/the thermography test controller (190), producing (326) a cooling profile associated with the thermography inspection area (32) the thermography test spot that represents a/the temperature of the thermography inspection area (32) as a function of time during the dwell time interval.

B26. The method (300) of paragraph B25, wherein the dwell time interval is one or more of at least 0.5 seconds (s), at least 1 s, at least 3 s, at least 5 s, at least 10 s, at most 12 s, at most 7 s, and at most 2 s.

B27. The method (300) of any of paragraphs B25-B26, wherein the generating (328) the thermography test signal (192) is based, at least in part, on the cooling profile.

B28. The method (300) of any of paragraphs B14-B27, wherein the one or more thermography sensor modules (140) includes a/the plurality of thermography sensor modules (140); wherein the one or more thermography support structures (120) includes:

a/the first thermography support structure (121) that supports a/the first sensor subset (141) of the plurality of thermography sensor modules (140); and a/the second thermography support structure (122) that supports a/the second sensor subset (142) of the plurality of thermography sensor modules (140); and wherein the positioning (312) the thermography sensor module (140) includes one or both of:

(i) moving (314) the first thermography support structure (121) relative to the test piece (10); and (ii) moving (316) the second thermography support structure (122) relative to the test piece (10).

B29. The method (300) of paragraph B28, wherein the moving (314) the first thermography support structure (121) and the moving (316) the second thermography support structure (122) are performed at least partially concurrently.

B30. The method (300) of any of paragraphs B28-B29, wherein the moving (314) the first thermography support structure (121) and the moving (316) the second thermography support structure (122) are performed independently of one another.

B31. The method (300) of any of paragraphs B28-B30, wherein the testing (310) the infrared test region (30) includes testing a/the first side (16) of the test piece (10) with the first sensor subset (141) and testing a/the second side (18) of the test piece (10) with the second sensor subset (142).

B32. The method (300) of any of paragraphs B14-B31, wherein the generating (328) the thermography test signal (192) includes generating one or more of:

(i) an/the alert indicating the presence of the one or more inconsistencies (20) within the infrared test region (30);

(ii) an/the image depicting one or both of at least a portion of the test piece (10) and the one or more inconsistencies (20) within the infrared test region (30); and (iii) a/the report identifying the one or more inconsistencies (20) within the infrared test region (30).

B33. The method (300) of any of paragraphs B1-B32, wherein the ultrasonic test assembly (210) includes:

an/the one or more ultrasonic sensor subassemblies (240), each ultrasonic sensor subassembly (240) including a/the respective excitation module (250) and a/the respective detector module (260);

an/the excitation generation light source (242) configured to generate an/the excitation generation light (244); and an/the ultrasonic test controller (290) configured to at least partially control operation of the ultrasonic test assembly (210);

wherein the testing (340) the ultrasonic test region (40) includes, for each ultrasonic sensor subassembly (240) of the one or more ultrasonic sensor subassemblies (240):

positioning (342) the ultrasonic sensor subassembly (240) relative to the test piece;

generating (348), with the excitation generation light source (242), the excitation generation light (244);

transmitting (350), with the respective excitation module (250) of at least one ultrasonic sensor subassembly (240) of the one or more ultrasonic sensor subassemblies (240), the excitation generation light (244) to a/the respective ultrasonic generation location (50) on an/the external surface (14) of the test piece (10) to produce a/the respective ultrasonic beam (52) that propagates within the test piece (10);

detecting (360), with the respective detector module (260) of at least one ultrasonic sensor subassembly (240) of the one or more ultrasonic sensor subassemblies (240), a/the respective reflected vibration (62) at an/the respective ultrasonic detect location (60) on the external surface (14) of the test piece (10); and generating (380), with the ultrasonic test controller (290), an/the ultrasonic test signal (292) based, at least in part, on the detecting (360) the respective reflected vibration (62).

B34. The method (300) of paragraph B33, wherein the ultrasonic test assembly (210) further includes a/the one or more ultrasonic sensor support structures (220) operatively supporting the one or more ultrasonic sensor subassemblies (240); and wherein the positioning (342) the ultrasonic sensor subassembly (240) relative to the test piece (10) includes positioning with the ultrasonic sensor support structure (220).

B35. The method (300) of any of paragraphs B33-B34, wherein the positioning (342) the ultrasonic sensor subassembly (240) is performed prior to the transmitting (350) the excitation generation light (244) to the respective ultrasonic generation location (50).

B36. The method (300) of any of paragraphs B33-B35, wherein the positioning the ultrasonic sensor support structure (220) is performed at least partially concurrently with one or more of the generating (348) the excitation generation light (244), the transmitting (350) the excitation generation light (244), the detecting (360) the respective reflected vibration (62), and the generating (380) the ultrasonic test signal (292).

B37. The method (300) of any of paragraphs B34-B36, wherein the one or more ultrasonic sensor subassemblies (240) includes a/the plurality of ultrasonic sensor subassemblies (240); wherein the one or more ultrasonic sensor support structures (220) includes:

a/the first ultrasonic sensor support structure (221) that supports a first ultrasonic sensor subset of the plurality of ultrasonic sensor subassemblies (240); and a/the second ultrasonic sensor support structure (222) that supports a second ultrasonic sensor subset of the plurality of ultrasonic sensor subassemblies (240); and wherein the positioning (342) the ultrasonic sensor subassembly (240) includes one or both of:

(i) moving (344) the first ultrasonic sensor support structure (221) relative to the test piece (10); and (ii) moving (346) the second ultrasonic sensor support structure (222) relative to the test piece (10).

B38. The method (300) of paragraph B37, wherein the moving (344) the first ultrasonic sensor support structure (221) and the moving (346) the second ultrasonic sensor support structure (222) are performed at least partially concurrently.

B39. The method (300) of any of paragraphs B37-B38, wherein the moving (344) the first ultrasonic sensor support structure (221) and the moving (346) the second ultrasonic sensor support structure (222) are performed independently of one another.

B40. The method (300) of any of paragraphs B37-B39, wherein the testing (340) the ultrasonic test region (40) includes testing a/the first side (16) of the test piece (10) with the first ultrasonic sensor subset and testing a/the second side (18) of the test piece (10) with the second ultrasonic sensor subset.

B41. The method (300) of any of paragraphs B33-B40, wherein the generating (348) the excitation generation light (244) includes generating a/the pulsed laser beam.

B42. The method (300) of any of paragraphs B33-B41, wherein the transmitting (350) the excitation generation light (244) to the respective ultrasonic generation location (50) includes conveying (352) the excitation generation light (244) from the excitation generation light source (242) to the respective excitation module (250) via a/the generation optical waveguide (252).

B43. The method (300) of any of paragraphs B33-B42, wherein the transmitting (350) the excitation generation light (244) to the respective ultrasonic generation location (50) includes radiating (354) the excitation generation light (244) from the respective excitation module (250) toward the respective ultrasonic generation location (50).

B44. The method (300) of paragraph B43, wherein the radiating (354) the excitation generation light (244) includes transmitting the excitation generation light (244) from a/the terminal end (256) of a/the generation optical fiber (254) to the respective ultrasonic generation location (50).

B45. The method (300) of any of paragraphs B33-B44, wherein the respective excitation module (250) is one of a/the plurality of excitation modules (250); and wherein the transmitting (350) the excitation generation light (244) includes transmitting (350) the excitation generation light (244) with the plurality of excitation modules (250) to a/the corresponding plurality of ultrasonic generation locations (50) that collectively define an/the ultrasonic test pattern (42).

B46. The method (300) of any of paragraphs B33-B45, wherein the ultrasonic test assembly (210) further includes a/the coherent receive light source (246); and wherein the detecting (360) the respective reflected vibration (62) includes:

generating (362), with the coherent receive light source (246), a/the coherent receive light (248);

transmitting (364) the coherent receive light (248) to the respective ultrasonic detect location (60) of at least one ultrasonic sensor subassembly (240) of the one or more ultrasonic sensor subassemblies (240); and receiving (370) a/the respective reflected receive light signal (266) from the respective ultrasonic detect location (60); and wherein the generating (380) the ultrasonic test signal (292) is based, at least in part, on the receiving (370) the respective reflected receive light signal (266).

B47. The method (300) of paragraph B46, wherein the transmitting (364) the coherent receive light (248) to the respective ultrasonic detect location (60) includes conveying (366) the coherent receive light (248) from the coherent receive light source (246) to a/the respective ultrasonic detector (262) of at least one ultrasonic sensor subassembly (240) of the one or more ultrasonic sensor subassemblies (240) with a/the receive optical waveguide (268).

B48. The method (300) of any of paragraphs B46-B47, wherein the transmitting (364) the coherent receive light (248) to the respective ultrasonic detect location (60) includes radiating (368) the coherent receive light (248) from the respective ultrasonic detector (262) toward the respective ultrasonic detect location (60).

B49. The method (300) of paragraph B48, wherein the radiating (368) the coherent receive light (248) to the respective ultrasonic detect location (60) includes transmitting the coherent receive light (248) from a/the terminal end (256) of a/the receive optical fiber (270) to the respective ultrasonic detect location (60).

B50. The method (300) of any of paragraphs B46-B49, wherein the receiving (370) the respective reflected receive light signal (266) includes receiving with a/the respective ultrasonic detector (262) of at least one ultrasonic sensor subassembly (240) of the one or more ultrasonic sensor subassemblies (240), optionally with a/the receive optical waveguide (268), optionally with a/the terminal end (256) of a/the receive optical fiber (270).

B51. The method (300) of paragraph B50, wherein the respective ultrasonic detector (262) is one of a/the plurality of ultrasonic detectors (262); and wherein the transmitting (364) the coherent receive light (248) includes transmitting with the plurality of ultrasonic detectors (262) to a portion of the test piece (10) corresponding to a/the ultrasonic test pattern (42).

B52. The method (300) of any of paragraphs B46-B51, wherein the ultrasonic test assembly (210) further includes an/the interferometer system (280); wherein the detecting (360) the respective reflected vibration (62) includes generating (382), with the interferometer system (280) and based, at least in part, on the receiving (370) the respective reflected receive light signal (266), a/the interferometer signal (282); and wherein the generating (380) the ultrasonic test signal (292) is based, at least in part, on the generating (382) the interferometer signal (282).

B53. The method (300) of any of paragraphs B33-B52, wherein the detecting (360) the respective reflected vibration (62) includes one or both of:

(i) detecting one or both of surface waves and shear waves of the respective reflected vibration (62), optionally with a first ultrasonic detector (262) of a/the plurality of ultrasonic detectors (262); and (ii) detecting longitudinal waves of the respective reflected vibration (62), optionally with a second ultrasonic detector (262) of the plurality of ultrasonic detectors (262).

B54. The method (300) of any of paragraphs B33-B53, wherein the generating (380) the ultrasonic test signal (292) includes:

generating (384) a test signal waveform based, at least in part, on the respective reflected receive light signal (266); and filtering (386) the test signal waveform with one or more bandpass filters.

B55. The method (300) of paragraph B54, wherein the one or more bandpass filters are configured to isolate a signal corresponding to a/the characteristic frequency of the respective ultrasonic beam (52).

B56. The method (300) of any of paragraphs B33-B55, wherein the generating (380) the ultrasonic test signal (292) includes generating one or more of:

(i) an/the alert indicating the presence of the one or more inconsistencies (20) within the ultrasonic test region (40);

(ii) an/the image depicting one or both of at least a portion of the test piece (10) and the one or more inconsistencies (20) within the ultrasonic test region (40); and (iii) a/the report identifying the one or more inconsistencies (20) within the ultrasonic test region (40).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A non-destructive test system for performing a non-destructive test on a test piece to detect a presence of inconsistencies within the test piece, the non-destructive test system comprising:

an infrared thermography assembly configured to test an infrared test region of the test piece to detect inconsistencies within the infrared test region; and an ultrasonic test assembly configured to test an ultrasonic test region of the test piece to detect inconsistencies within the ultrasonic test region;

wherein the infrared thermography assembly includes:

one or more thermography sensor modules, each thermography sensor module configured to receive infrared imaging data from the test piece; and a thermography test controller configured to at least partially control operation of the infrared thermography assembly;
wherein the thermography test controller is configured to generate a thermography test signal based, at least in part, on the infrared imaging data;
wherein the ultrasonic test assembly includes:
one or more ultrasonic sensor subassemblies, each ultrasonic sensor subassembly including a respective excitation module and a respective detector module; and
an ultrasonic test controller configured to at least partially control operation of the ultrasonic test assembly;
wherein the respective excitation module of each ultrasonic sensor subassembly of the one or more ultrasonic sensor subassemblies is configured to produce a respective ultrasonic beam that propagates within the test piece; wherein the respective detector module of each ultrasonic sensor subassembly of the one or more ultrasonic sensor subassemblies is configured to detect a respective reflected vibration at a respective ultrasonic detect location on an external surface of the test piece; wherein the respective reflected vibration is generated within the test piece responsive to the respective ultrasonic beam; and wherein the ultrasonic test controller is configured to generate an ultrasonic test signal based, at least in part, on each respective reflected vibration; and
wherein the infrared thermography assembly and the ultrasonic test assembly share one or more shared support structures for positioning components of the infrared thermography assembly and of the ultrasonic test assembly relative to the test piece, and wherein the infrared thermography assembly and the ultrasonic test assembly are configured to test the infrared test region and the ultrasonic test region at least partially concurrently.

2. The non-destructive test system of claim 1, wherein one or both of the infrared thermography assembly and the ultrasonic test assembly is configured to detect inconsistencies that include one or more of a wrinkle, an impurity, a void, an inclusion, a porosity, a crack, a joint inconsistency, a bond discontinuity, a delamination, and corrosion.

3. The non-destructive test system of claim 1, wherein at least a portion of the ultrasonic test controller includes at least a portion of the thermography test controller.

4. The non-destructive test system of claim 1, wherein the infrared thermography assembly further includes one or more thermography support structures; wherein each thermography support structure of the one or more thermography support structures:
(i) operatively supports a corresponding subset of the one or more thermography sensor modules; and
(ii) is configured to selectively and operatively position the corresponding subset of the one or more thermography sensor modules relative to the test piece;
wherein the ultrasonic test assembly further includes one or more ultrasonic sensor support structures; wherein each ultrasonic sensor support structure of the one or more ultrasonic sensor support structures:
(i) operatively supports a corresponding subset of the one or more ultrasonic sensor subassemblies; and
(ii) is configured to selectively and operatively position the corresponding subset of the one or more ultrasonic sensor subassemblies relative to the test piece; and
wherein one or both of:

(i) at least one thermography support structure of the one or more thermography support structures includes at least a portion of the one or more ultrasonic sensor support structures; and
(ii) at least one ultrasonic sensor support structure of the one or more ultrasonic sensor support structures includes at least a portion of the one or more thermography support structures.

5. The non-destructive test system of claim 1, wherein each thermography sensor module includes an infrared camera that is configured to receive the infrared imaging data from the test piece; wherein each thermography sensor module further includes at least one thermal source that is configured to transmit an applied thermal excitation to a thermography inspection area of the test piece; and wherein the infrared camera is configured to collect the infrared imaging data from the thermography inspection area over a dwell time interval to produce a cooling profile associated with the thermography inspection area.

6. The non-destructive test system of claim 1, wherein the infrared thermography assembly further includes a plurality of thermography support structures; wherein the one or more thermography sensor modules includes a plurality of thermography sensor modules; wherein each thermography support structure of the plurality of thermography support structures:
(i) operatively supports a corresponding subset of the plurality of thermography sensor modules; and
(ii) is configured to selectively and operatively position the corresponding subset of the plurality of thermography sensor modules relative to the test piece;
wherein at least one of the plurality of thermography support structures supports the corresponding subset of the plurality of thermography sensor modules such that the corresponding subset of the plurality of thermography sensor modules forms an array that at least substantially spans the test piece; and wherein the plurality of thermography support structures includes:
a first thermography support structure that supports a first sensor subset of the plurality of thermography sensor modules; and
a second thermography support structure that supports a second sensor subset of the plurality of thermography sensor modules.

7. The non-destructive test system of claim 6, wherein the first sensor subset is configured to test a first side of the test piece; and wherein the second sensor subset is configured to test a second side of the test piece that is opposite the first side.

8. The non-destructive test system of claim 1, wherein the ultrasonic test assembly further includes an excitation generation light source configured to generate an excitation generation light; wherein the respective excitation module of each ultrasonic sensor subassembly of the one or more ultrasonic sensor subassemblies is configured to transmit the excitation generation light to a respective ultrasonic generation location on an external surface of the test piece to produce the respective ultrasonic beam; wherein the ultrasonic test assembly further includes a coherent receive light source configured to generate a coherent receive light; wherein the respective detector module of at least one ultrasonic sensor subassembly of the one or more ultrasonic sensor subassemblies includes a respective ultrasonic detector configured to:
(i) transmit the coherent receive light to the respective ultrasonic detect location; and (ii) receive a respective reflected receive light signal that includes a portion of the coherent receive light that is reflected by the test piece; and
wherein the ultrasonic test signal is based, at least in part, on the respective reflected receive light signal.

9. The non-destructive test system of claim 8, wherein the respective ultrasonic generation location and the respective ultrasonic detect location of at least one ultrasonic sensor subassembly of the one or more ultrasonic sensor subassemblies are at least partially overlapping.

10. The non-destructive test system of claim 8, wherein the ultrasonic test assembly further includes an interferometer system that is configured to generate an interferometer signal based, at least in part, on the coherent receive light and the respective reflected receive light signal corresponding to at least one respective ultrasonic detector of the one or more ultrasonic sensor subassemblies; and wherein the ultrasonic test controller is configured to generate the ultrasonic test signal based, at least in part, on the interferometer signal.

11. The non-destructive test system of claim 1, wherein the one or more ultrasonic sensor subassemblies includes a plurality of ultrasonic sensor subassemblies that are configured to test the test piece concurrently; wherein the ultrasonic test assembly further includes a plurality of ultrasonic sensor support structures; wherein each ultrasonic sensor support structure of the plurality of ultrasonic sensor support structures:
(i) operatively supports a corresponding subset of the plurality of ultrasonic sensor subassemblies; and
(ii) is configured to selectively and operatively position the corresponding subset of the plurality of ultrasonic sensor subassemblies relative to the test piece;
wherein each ultrasonic sensor support structure of the plurality of ultrasonic sensor support structures operatively supports at least one corresponding ultrasonic sensor subassembly of the plurality of ultrasonic sensor subassemblies; and wherein the plurality of ultrasonic sensor support structures are configured to selectively reposition the plurality of ultrasonic sensor subassemblies at least partially independent of one another.

12. The non-destructive test system of claim 1, wherein the one or more shared support structures comprise a robotic arm.

13. A method of performing a non-destructive test on a test piece to detect a presence of inconsistencies within the test piece using a non-destructive test system that comprises:
an infrared thermography assembly configured to test an infrared test region of the test piece to detect inconsistencies within the infrared test region; and
an ultrasonic test assembly configured to test an ultrasonic test region of the test piece to detect inconsistencies within the ultrasonic test region;
wherein the infrared thermography assembly includes:
one or more thermography sensor modules, each thermography sensor module configured to receive infrared imaging data from the test piece; and
a thermography test controller configured to at least partially control operation of the infrared thermography assembly;
wherein the thermography test controller is configured to generate a thermography test signal based, at least in part, on the infrared imaging data;
wherein the ultrasonic test assembly includes:
one or more ultrasonic sensor subassemblies, each ultrasonic sensor subassembly including a respective excitation module and a respective detector module; and
an ultrasonic test controller configured to at least partially control operation of the ultrasonic test assembly;
wherein the respective excitation module of each ultrasonic sensor subassembly of the one or more ultrasonic sensor subassemblies is configured to produce a respective ultrasonic beam that propagates within the test piece; wherein the respective detector module of each ultrasonic sensor subassembly of the one or more ultrasonic sensor subassemblies is configured to detect a respective reflected vibration at a respective ultrasonic detect location on an external surface of the test piece; wherein the respective reflected vibration is generated within the test piece responsive to the respective ultrasonic beam; and wherein the ultrasonic test controller is configured to generate an ultrasonic test signal based, at least in part, on each respective reflected vibration; and
wherein the method comprises:
testing the infrared test region with the infrared thermography assembly to detect inconsistencies within the infrared test region; and
testing the ultrasonic test region of the test piece with the ultrasonic test assembly to detect inconsistencies within the ultrasonic test region; and
wherein the testing the infrared test region and the testing the ultrasonic test region are performed at least partially concurrently.

14. The method of claim 13, wherein the test piece remains at least substantially stationary relative to at least a portion of the non-destructive test system during each of the testing the infrared test region and the testing the ultrasonic test region.

15. The method of claim 13, further comprising:
prior to the testing the infrared test region, identifying the infrared test region; and, prior to the testing the ultrasonic test region, identifying the ultrasonic test region;
wherein one or both of the identifying the infrared test region and the identifying the ultrasonic test region includes identifying such that one or more of:
(i) an average thickness of the test piece within the ultrasonic test region is greater than an average thickness of the test piece within the infrared test region;
(ii) the infrared test region is larger in area than the ultrasonic test region; and
(iii) the infrared test region and the ultrasonic test region are at least partially overlapping.

16. The method of claim 15, wherein the testing the infrared test region is performed at least partially prior to the testing the ultrasonic test region; wherein the identifying the ultrasonic test region is based, at least in part, on the testing the infrared test region; and wherein the identifying the ultrasonic test region includes defining the ultrasonic test region to include one or more locations corresponding to inconsistencies identified during the testing the infrared test region.

17. The method of claim 13, wherein the infrared thermography assembly includes one or more thermography sensor modules; wherein each thermography sensor module includes an infrared camera with a field of view and at least one thermal source; and wherein the testing the infrared test region includes, for each thermography sensor module of the one or more thermography sensor modules:

positioning the thermography sensor module at a thermography inspection area of the test piece such that the field of view encompasses the thermography inspection area;

transmitting, with the at least one thermal source, an applied thermal excitation to the thermography inspection area;

receiving, with the infrared camera, the infrared imaging data from the thermography inspection area; and generating, with the thermography test controller, the thermography test signal based, at least in part, on the infrared imaging data;

wherein the infrared thermography assembly further includes one or more thermography support structures; and wherein the positioning the thermography sensor module includes positioning with a corresponding thermography support structure of the one or more thermography support structures that supports the thermography sensor module.

18. The method of claim 17, wherein the one or more thermography sensor modules includes a plurality of thermography sensor modules; wherein the one or more thermography support structures includes:

a first thermography support structure that supports a first sensor subset of the plurality of thermography sensor modules; and a second thermography support structure that supports a second sensor subset of the plurality of thermography sensor modules; and wherein the positioning the thermography sensor module includes one or both of:

(i) moving the first thermography support structure relative to the test piece; and (ii) moving the second thermography support structure relative to the test piece.

19. The method of claim 13, wherein the ultrasonic test assembly further includes an excitation generation light source configured to generate an excitation generation light; wherein the respective excitation module of each ultrasonic sensor subassembly of the one or more ultrasonic sensor subassemblies is configured to transmit the excitation generation light to a respective ultrasonic generation location on an external surface of the test piece to produce the respective ultrasonic beam; wherein the testing the ultrasonic test region includes, for each ultrasonic sensor subassembly of the one or more ultrasonic sensor subassemblies:

positioning the ultrasonic sensor subassembly relative to the test piece;

generating, with the excitation generation light source, the excitation generation light;

transmitting, with the respective excitation module of at least one ultrasonic sensor subassembly of the one or more ultrasonic sensor subassemblies, the excitation generation light to the respective ultrasonic generation location on the external surface of the test piece to produce the respective ultrasonic beam that propagates within the test piece;

detecting, with the respective detector module of at least one ultrasonic sensor subassembly of the one or more ultrasonic sensor subassemblies, the respective reflected vibration at the respective ultrasonic detect location on the external surface of the test piece; and generating, with the ultrasonic test controller, the ultrasonic test signal based, at least in part, on the detecting the respective reflected vibration;

wherein the ultrasonic test assembly further includes one or more ultrasonic sensor support structures operatively supporting the one or more ultrasonic sensor subassemblies; and wherein the positioning the ultrasonic sensor subassembly relative to the test piece includes positioning with the ultrasonic sensor support structure.

20. The method of claim 19, wherein the one or more ultrasonic sensor subassemblies includes a plurality of ultrasonic sensor subassemblies; wherein the one or more ultrasonic sensor support structures includes:

a first ultrasonic sensor support structure that supports a first ultrasonic sensor subset of the plurality of ultrasonic sensor subassemblies; and a second ultrasonic sensor support structure that supports a second ultrasonic sensor subset of the plurality of ultrasonic sensor subassemblies; and wherein the positioning the ultrasonic sensor subassembly includes one or both of:

(i) moving the first ultrasonic sensor support structure relative to the test piece; and (ii) moving the second ultrasonic sensor support structure relative to the test piece.

\* \* \* \* \*